United States Patent [19]

Moran et al.

[11] Patent Number: 5,270,780
[45] Date of Patent: Dec. 14, 1993

[54] DUAL DETECTOR LIDAR SYSTEM AND METHOD

[75] Inventors: Steven E. Moran, San Diego; Robert O. Ginaven, Encinitas; P. Erik Odeen, San Diego, all of Calif.

[73] Assignee: Science Applications International Corporation, San Diego, Calif.

[21] Appl. No.: 759,566

[22] Filed: Sep. 13, 1991

[51] Int. Cl.[5] .......................... G01C 3/08; H01J 31/00; H04N 7/00
[52] U.S. Cl. ...................................... 356/5; 313/373; 358/95
[58] Field of Search ............... 356/5; 358/95; 313/373

[56] References Cited

U.S. PATENT DOCUMENTS

| | | |
|---|---|---|
| 2,541,374 | 2/1951 | Morton . |
| 2,996,946 | 8/1961 | Brendholdt . |
| 3,278,753 | 10/1966 | Pitts et al. . |
| 3,305,633 | 2/1967 | Chernoch . |
| 3,360,793 | 12/1967 | Collis . |
| 3,380,358 | 4/1968 | Neumann . |
| 3,426,207 | 2/1969 | Fried et al. . |
| 3,446,555 | 5/1969 | Kahn . |
| 3,446,556 | 5/1969 | Collis . |
| 3,467,773 | 9/1969 | Heckman, Jr. . |
| 3,499,110 | 3/1970 | Heckman, Jr. . |
| 3,527,533 | 9/1970 | Hook et al. . |
| 3,527,881 | 9/1970 | Blanchard . |
| 3,555,178 | 1/1971 | Humiston et al. . |
| 3,566,021 | 2/1971 | Jakes, Jr. . |
| 3,604,803 | 9/1971 | Kahn . |
| 3,649,124 | 3/1972 | Takaoka et al. . |
| 3,669,540 | 6/1972 | Rattman et al. . |
| 3,669,541 | 6/1972 | Duguay . |
| 3,670,098 | 6/1972 | Korpel . |
| 3,674,925 | 7/1972 | Heckman Jr. . |
| 3,682,553 | 8/1972 | Kapany . |
| 3,689,156 | 9/1972 | Kerpchar . |
| 3,723,648 | 3/1973 | Cornsweet . |
| 3,743,418 | 7/1973 | Heflinger . |
| 3,761,180 | 9/1973 | Maxwell, Jr. et al. . |
| 3,781,552 | 9/1973 | Kadrmas . |
| 3,782,824 | 1/1974 | Stoliar et al. . |
| 3,834,795 | 9/1974 | Erickson et al. . |
| 3,848,999 | 11/1974 | Dall'Armi . |
| 3,886,303 | 5/1975 | Morris . |
| 3,895,388 | 7/1975 | Townsend . |
| 3,897,150 | 7/1975 | Bridges et al. . |
| 3,899,250 | 8/1975 | Bamberg et al. . |
| 3,902,803 | 9/1975 | Lego, Jr. . |

(List continued on next page.)

OTHER PUBLICATIONS

Kornstein, E. and Wetzstein, H. "Blue-green High-powered Light Extends Underwater Visibility," *Electronics*, pp. 140-150 (Oct. 1968).

(List continued on next page.)

Primary Examiner—Stephen C. Buczinski
Attorney, Agent, or Firm—Fitch, Even, Tabin & Flannery

[57] ABSTRACT

A light detection and ranging (LIDAR) system uses dual detectors to provide three-dimensional imaging of underwater objects (or other objects hidden by a partially transmissive medium). One of the detectors is a low resolution, high bandwidth detector. The other is a high resolution, narrow bandwidth detector. An initial laser pulse is transmitted to known x-y coordinates of a target area. The photo signals returned from the target area from this initial pulse are directed to the low resolution, high bandwidth detector, where a preliminary determination as to the location (depth, or z coordinate) of an object in the target area is made based on the time-of-receipt of the return photo signal. A second laser pulse is then transmitted to the target area and the return photo signals from such second laser pulse are directed to the high resolution, narrow bandwidth detector. This high resolution detector is gated on at a time so that only photo signals returned from a narrow "slice" of the target area (corresponding to the previously detected depth of the object) are received. An image of the detected object is then reconstructed from the signals generated by the high resolution detector. In a preferred embodiment, the two detectors are housed in a single digicon tube, with magnetic deflection being used to steer the beam to the appropriate detector.

41 Claims, 7 Drawing Sheets

U.S. PATENT DOCUMENTS

| | | |
|---|---|---|
| 3,934,077 | 1/1976 | Wood et al. |
| 3,934,082 | 1/1976 | Gordon |
| 3,947,119 | 3/1976 | Bamberg et al. |
| 4,030,831 | 6/1977 | Gowrinathan |
| 4,050,819 | 9/1977 | Lichtman |
| 4,129,780 | 12/1978 | Laughlin |
| 4,143,400 | 3/1979 | Heckman, Jr. et al. |
| 4,174,524 | 11/1979 | Moran |
| 4,193,088 | 3/1980 | Moran |
| 4,195,221 | 3/1980 | Moran |
| 4,195,311 | 3/1980 | Moran |
| 4,197,088 | 4/1980 | Meserol et al. |
| 4,199,253 | 4/1980 | Ross |
| 4,226,529 | 10/1980 | French |
| 4,239,388 | 12/1980 | Green |
| 4,270,142 | 5/1981 | Mackelburg et al. |
| 4,277,167 | 7/1981 | Eppel |
| 4,298,280 | 11/1981 | Harney |
| 4,380,391 | 4/1983 | Buser et al. |
| 4,397,549 | 8/1983 | Morgan |
| 4,471,378 | 7/1984 | Ng |
| 4,515,471 | 5/1985 | Eden |
| 4,515,472 | 5/1985 | Welch |
| 4,518,254 | 5/1985 | Penny et al. |
| 4,603,250 | 7/1986 | Contini et al. |
| 4,634,272 | 1/1987 | Endo |
| 4,639,590 | 1/1987 | Butterwick |
| 4,646,140 | 2/1987 | Bailey et al. |
| 4,687,326 | 8/1987 | Corby, Jr. |
| 4,688,086 | 8/1987 | Hutchin |
| 4,708,473 | 11/1987 | Metzdorff et al. |
| 4,717,252 | 1/1988 | Halldorsson et al. |
| 4,727,259 | 2/1988 | Halvis |
| 4,754,151 | 6/1988 | Billard |
| 4,757,200 | 7/1988 | Shepherd |
| 4,796,090 | 1/1989 | Fraier |
| 4,825,062 | 4/1989 | Rather et al. |
| 4,862,257 | 8/1989 | Ulich |
| 4,865,454 | 9/1989 | Lazzarini et al. |
| 4,905,009 | 2/1990 | Ulich et al. |
| 4,950,878 | 8/1990 | Ulich et al. |
| 4,963,024 | 10/1990 | Ulich |
| 4,964,721 | 10/1990 | Ulich et al. |
| 4,967,270 | 10/1990 | Ulich et al. |
| 5,013,917 | 5/1991 | Ulich |

OTHER PUBLICATIONS

Tull et al., "Self-Scanned Digicon: a Digital Image Tube for Astronomical Spectroscopy," *Applied Optics*, vol. 14, No. 5 pp. 1182–1189 (May 1975).

J. Choisser, "Detecting Photoelectron Images with Semiconductor Arrays for Multichannel Photon Counting," *Optical Engineering*, vol. 16, No. 3, pp. 262–266 (May–Jun. 1977).

Choisser et al., "Measurement of Electron Irradiation Damage to Thinned Fairchild and Texas Instruments Charge–Coupled Devices (CCDs)," *SPIE* (Society of Photo–Optical Instrumentation Engineers).

Ginaven et al., "Testing of Space Telescope 512 Channel Digicon," *SPIE* (Society of Photo–Optical Instrumentation Engineers), vol. 203 pp. 7–13 (1979).

Ginaven et al., "State–Of–The–Art Space Telescope Digicon Performance Data," *SPIE* (Society of Photo–optical Instrumentation Engineers), vol. 217, Advances in Focal Plane Technology, pp. 55–68 (1980).

The Engineering Staff of Electronic Vision & Systems Division of Science Applications, Inc., "Digicons in Space", Electro–Optical Systems Design, pp. 29–37 (Sep. 1980).

Ginaven et al., "Faint Object Spectrograph (FOS) 512 Channel Digicon Detector Performance Data," *SPIE* (Society of Photo–optical Instrumentation Engineers), vol. 2901, Solid State Imagers for Astronomy, pp. 81–89 (Jun. 1981).

Hier et al., "Charge Coupled Device (CCD) Digicon Detector Systems Concepts," *SPIE* (Society of Photo–Optical Instrumentation Engineers, vol. 363, Advanced Remote Sensing, pp. 56–65 (Aug. 1982).

Ginaven et al., "Performance of a Digicon Photon Counting Autoguider System," *SPIE* (Society of Photo–Optical Instrumentation Engineers), vol. 445, Instrumentation in Astronomy V, pp. 219–228 (Sep. 1983).

Schardt et al., "Design and Development of a 1024×1024 Visable Imager", vol. 501, State–of–the–Art Imaging Arrays and Their Applications, pp. 74–74 (Aug. 1984).

Beaver et al., "S–20 Photocathode Stability Considerations," *9th Symposium on Photoelectronic Imaging Devices*, (1987).

DUAL DETECTOR LIDAR SYSTEM AND METHOD

BACKGROUND OF THE INVENTION

The present invention relates generally to a remote detection and imaging system. More particularly, the invention relates to a light detection and ranging (LIDAR) system using dual detectors that allows remote three-dimensional imaging of underwater objects, or other objects hidden by a partially transmissive medium.

LIDAR technology relies upon the time-of-flight of a light pulse, typically a short burst of laser energy, to and from an object to determine the range (location) of the object relative to the source of the light pulse. Using LIDAR technology, for example, it is possible to detect a submerged object from an airborne platform. The underwater objects remotely detected by a LIDAR system are normally categorized as being either small (on the order of 1 meter) and shallow, e.g., a moored mine; or large (greater than 10 m) and deep, e.g., a submarine.

Recently, there has been a great interest in using LIDAR systems not only to detect the presence of an underwater object, but also to provide an image of the detected object so that the object can be classified and/or identified. If a LIDAR system is to be used to efficiently identify and classify an object, it will normally be necessary to generate a high resolution image of the outer surface of the object. This, in turn, requires that the object depth be known, i.e., that the round trip time of a light pulse to and from the object be known (or otherwise be determinable), so that an appropriate detector or camera can be enabled (gated ON) at just that time, thereby receiving a return pulse of light from just the object, and not from some other object or medium that is above or below the object. Unfortunately, until the object has been detected, the approximate round trip time of the light pulse is not known, and the LIDAR system cannot be efficiently used for imaging. Hence, heretofore it has generally been necessary to first use the LIDAR system to hunt for the object, and to second (once the object has been found) provide a sufficiently high resolution image to identify and/or classify the object.

In hunting for an object using a LIDAR system, a first laser pulse is generated from a location above a target area (generally a body of water), and a suitable camera (or other detector) is shuttered ON at a time that corresponds to a pulse returning from a given depth or "slice" of the target volume. If nothing is detected at that depth, then another pulse is generated and the camera is shuttered ON at a time that corresponds to a pulse returning from a slightly different depth. In this way, i.e., by generating multiple pulses and gating ON a detector at slightly different times for each return pulse, the target volume is examined "slice" by "slice" until an object, if any, is located within the target volume.

Unfortunately, the above-described approach requires the generation of multiple laser pulses, and thus requires a great deal of laser power. Further, the described approach provides an extremely slow scan rate, or the rate at which a given target volume can be examined for the presence of an object. This is because the target volume must be examined slice by slice, and each slice requires the generation of a laser pulse and the looking for a return pulse at a particular shutter ON time relative to the laser pulse generation. Hence, what is needed is a more efficient LIDAR system that utilizes less power and provides a faster scan rate.

In principle, the foregoing deficiencies can be addressed by generating a single laser pulse and employing multiple gated cameras as detectors. Each camera is equipped with a separate receiver optical system, and all of the cameras are adjusted to image the same portion of the exposed surface of the target volume (which is typically the surface of a body of water). Assuming N gated cameras, the gate timing among the N gated cameras is adjusted so that with the transmission of a single laser pulse, N different gate images are generated, with each image corresponding to a separate "slice" of the target volume.

Using multiple gated cameras in this manner has not been reported previously, to applicants' knowledge, and thus represents one embodiment of applicants' invention. However, using multiple gated cameras is not a preferred embodiment because it requires very complex and relatively large signal processing equipment having relatively high power requirements. Further, using multiple gated cameras limits the maximum receiver optics aperture, and because of the massive on-board signal processing requirements, occupies a large portion of the available airborne packaging space. Hence, what is needed is a LIDAR system that is not only simple in terms of processing capabilities, but which is also small and light weight, consumes little power, and is reliable in its operation.

As taught in U.S. Pat. No. 4,862,257, issued to Ulich, it is known in the art to use an imaging LIDAR system for both the detection and classification of submerged objects. In the '257 patent, a system is described wherein a short pulse of laser light is projected down toward the surface of the water and to any objects that may be submerged below the surface of the water. At least one, and preferably two, range gated intensified charge coupled device (CCD) camera(s) are electronically shuttered (gated ON) during a time interval which coincides with the round trip propagation time of the laser pulse to and from the object. The resulting gated images are displayed on a CRT. The gated image from one CCD camera is timed to coincide with the depth of the object. The gated image from the other CCD camera is timed to coincide with the shadow of the object against the backscattered light. These two images are then subtracted to improve the detectability of the object.

Unfortunately, the approach proposed in the '257 patent requires that initial detection of the object be performed so that the cameras can be shuttered at an appropriate time. This difficulty can be overcome in principle by modifying the teachings of the '257 patent by setting one deep gate at the greatest depth an object is expected to be encountered. Objects shallower than this depth can be detected based on the shadow signature alone. However, this modified approach discards the direct reflection from the object surface, thereby reducing the detection signal-to-noise ratio (SNR). It also limits the detection SNR for all shallower object depths to the lower SNR value associated with a single deep gate.

The '257 patent also teaches the generation and transmission of laser pulses at a prescribed frequency, e.g., 15 Hz, and the use of a glint detector to detect the return pulse from the water surface. The glint return triggers a basic timing reference point from which a precise time delay is measured and/or adjusted in order to gate ON a CCD camera at the appropriate time. Because of the time delays involved (>1 ms), it turns out that the CCD camera is actually triggered on the previously detected glint pulse. See col. 7, lines 10-11, of the '257 patent. Use of the glint return pulse allows the system, once calibrated, to operate independent of the distance from the water surface.

Unfortunately, however, use of a glint pulse in the manner described in the '257 patent still requires some "hunting" for the exact location (depth) of the target, so that the appropriate delays may be generated to gate ON the CCD camera at the appropriate time to see the object.

It is clear, therefore, that significant benefits in detection SNR, laser power utilization efficiency, search rate, and signal processing load will accrue if the foregoing difficulties can be alleviated.

SUMMARY OF THE INVENTION

The present invention addresses the above and other needs by providing a light detection and ranging (LIDAR) system that uses dual detectors, preferably within a single reflected light receiving envelope. One of the detectors is a low resolution, high temporal bandwidth detector, that is used to preliminarily locate the object. The other detector is a high resolution detector that is used to provide an image of the object once located. Besides these two detectors, the system includes means for generating and transmitting a laser pulse, means for receiving a reflected laser pulse and selectively directing it to one of the two detectors, and signal processing means for processing the respective output signals generated by the detectors. In some embodiments of the invention, the processing means includes the ability to generate a relatively high resolution image of the detected object and to classify the object based on its generated image. In still other embodiments, the processing means further includes the ability to generate a three-dimensional image of the detected object.

In operation, the LIDAR system of the present invention transmits an initial laser pulse to known x-y coordinates of an area being examined, e.g., to known x-y coordinates on the surface of a body of water wherein an object may be hidden. (Note: the volume of water below the known x-y coordinates is frequently referred to herein as the "target volume".) The laser signals returned or reflected from the target volume as a result of this initial pulse are directed to the low resolution, high bandwidth detector. The low resolution detector is gated ON for a sufficiently long period of time to receive return signals from anywhere within the entire target volume. When a return signal is detected with the low resolution, high bandwidth detector, a preliminary determination is made as to the rough x-y coordinates of the object within the resolution capability of the low resolution detector. Further, a preliminary determination as to the location (depth, or z coordinate) of an object in the target volume is made based on the time-of-receipt of the signal bearing portion of the return laser pulse. A second laser pulse is then transmitted to the target volume and the return laser pulse from such second laser pulse is directed to the high resolution detector. Advantageously, the high resolution detector is gated ON so as to receive laser energy returned from a narrow "slice" of the target volume (corresponding to the previously detected depth of the object). An image of the detected object is then reconstructed from the output signals of the high resolution detector.

In accordance with one aspect of the invention, consecutive vertical slices of a given target volume may be examined, imaged and reconstructed in order to provide a three-dimensional image of an object within such target volume.

The present invention may thus be broadly characterized as a light detection and ranging (LIDAR) method or system used to remotely detect and identify the location of an object within specified coordinates of a target area. Such method or system includes the following steps (method), or means for performing the following steps (system):

(1) transmitting a first pulse of laser energy at known coordinates in the target area from a location above the target area;

(2) detecting a first return pulse of laser energy reflected from an object within the target area and measuring the time at which the return pulse is detected relative to the time at which the first laser pulse is transmitted, thereby providing a "round-trip" signal transmission time, the round-trip signal transmission time providing a measure of the depth of the object within the target area;

(3) transmitting a second pulse of laser energy at the same coordinates of the target area at which the first pulse of laser energy was transmitted;

(4) detecting a second return pulse of laser energy after waiting the round-trip signal transmission time from the time the second laser pulse was transmitted, whereby the second return pulse contains only laser energy reflected from the object; and (5) electronically processing the second return pulse to form an image of the detected object.

Advantageously, the detection of the first and second return pulses is facilitated through the use of a dual detector digicon. Such dual detector digicon includes an evacuated tube having a longitudinal axis. At one end of the evacuated tube is a photocathode that respectively receives the first and second return pulses and converts them to an electron beam. Conventional means are then used to accelerate and focus the electron beam along the longitudinal axis so that the beam strikes an anode at the other end of the evacuated tube. Two spaced apart anode detectors are used within the same evacuated tube. A first anode detector, positioned off-line from the longitudinal axis, comprises a low resolution detector that has a high bandwidth. The first anode detector may be realized, e.g., from a diode array, and is designed to receive an electron beam that corresponds to the first return pulse. A second anode detector, positioned on-line with the longitudinal axis, comprises a high resolution detector. The second anode detector may be realized, e.g., from a charge coupled device (CCD) array having a large number of segments or pixels, each of which generates its own output signal as a function of the intensity of the electron beam that falls thereon. The second anode detector is designed to receive an electron beam corresponding to the second return pulse.

Magnetic deflection means are also included as part of the dual detector digicon to selectively deflect the electron beam to either the first anode detector or the second anode detector. Because the first anode detector is the only detector that is off-line from the longitudinal axis of the digicon, the magnetic deflection means must be turned on whenever it is desired to deflect the electron beam to the first anode detector, i.e., whenever it is desired to detect the first return pulse. When it is desired to direct the electron beam to the second anode detector, i.e., whenever it is desired to detect the second return pulse, the magnetic deflection means are simply turned off.

Thus, in operation, a first laser pulse is transmitted at the target area, and the low resolution, high bandwidth detector (e.g., first anode detector) is activated to look for a return pulse. If a return pulse is received having the same wavelength as the transmitted pulse, that means there is likely an object in the target area that caused the reflection or return of the laser pulse. The time of receipt of this first returned pulse is noted relative to the time at which the first laser pulse was transmitted, thereby providing an indication of the "round-trip" transmission or propagation time of the laser pulse. The round trip transmission time thus identifies the location, e.g., depth, of the object within the target area. A second laser pulse is then transmitted, and the high resolution detector (e.g., second anode detector) is activated only for a very narrow period of time that begins after the round trip transmission time. In this manner, a second return pulse is received that is reflected only off of the object. The second return pulse is directed to the high resolution detector where it is further processed in order to generate an image of the object.

Hence, the first laser pulse and its corresponding return pulse are used to find or locate an object within the target area. In transmitting the first laser pulse and receiving its corresponding return pulse, the LIDAR system operates in a detection mode of operation. The second laser pulse and its corresponding gated return pulse are then used to zero in on the detected object, i.e., to take a second look at the object with sufficient resolution to allow an image of the object to be generated. In transmitting the second laser pulse and receiving its corresponding return pulse, the LIDAR system thus operates in a classification mode of operation. The image thus generated will frequently provide sufficient detail to allow the object to be classified or identified.

Advantageously, only two laser pulses, in combination with a straightforward detection and gating scheme, are needed by the LIDAR system of the present invention to detect, locate and identify/classify many objects. This is in contrast to the prior art LIDAR systems that have required multiple laser pulses directed at the same target coordinates and/or complex gating and detection schemes in order to process and interpret the returned pulses.

If a three dimensional image of the object is needed to provide additional information relative to identifying/classifying the object, then more than two laser pulses are required. However, this still represents a significant improvement over prior art systems because only a single pulse is needed by the present invention to initially detect and locate the object. Hence, additional "hunting" for the object through vertical slices in a target volume, each slice requiring an additional laser pulse, is not required.

Further, as previously indicated, another embodiment of the invention employs multiple gated cameras as detectors. Each camera is equipped with a separate receiver optical system, and all of the cameras are adjusted to image the same portion of the target surface, i.e., the same portion of the exposed surface of the target volume (which is typically the surface of a body of water). Assuming N gated cameras, the gate timing among the N gated cameras is adjusted so that with the transmission of a single laser pulse, N different gate images are generated, with each image corresponding to a separate "slice" of the target volume.

It is thus a feature of the present invention to provide a LIDAR system or method that is simple and reliable in its operation and use.

It is another feature of the invention to provide such a LIDAR system or method that consumes less power and provides a faster scan rate than has heretofore been possible using prior art LIDAR systems and methods.

It is yet another feature of the invention to provide a LIDAR system that is simple in terms of its processing capabilities, is small and light weight in terms of its physical characteristics, consumes relatively little input power, and is efficient and reliable in its operation.

It is an additional feature of the invention to provide a LIDAR system that can remotely detect and identify and/or classify many types of objects that are underwater, or within similar types of partially transmissive mediums, by generating only a pair of laser pulses.

It is still another feature of the invention to provide a LIDAR system that can remotely detect an object in a partially transmissive medium, such as water, and provide at least a rough three dimensional image of such object.

It is a further feature of the invention to provide a remote detection and imaging system that offers improved SNR for the returned signal, and which does not require significant signal processing power.

It is an additional feature of the invention to provide a dual detector digicon that can selectively detect light pulses using either a low resolution, high bandwidth detector having a low number of pixels $N_L$ (e.g., 1–256), or a high resolution detector having a high number of pixels $N_H$, where $N_H$ is greater than $N_L$.

It is yet a further feature of the invention to provide a LIDAR system wherein high resolution imaging can be performed using a high resolution detector without requiring a short focal length, thereby permitting an increase in the aperture size, and thus significantly improving the image signal-to-noise ratio.

BRIEF DESCRIPTION OF THE DRAWINGS

The above and other aspects, features and advantages of the present invention will be more apparent from the following more particular description thereof, presented in conjunction with the following drawings wherein.

It is noted that throughout the several views of the drawings corresponding reference characters indicate corresponding components.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
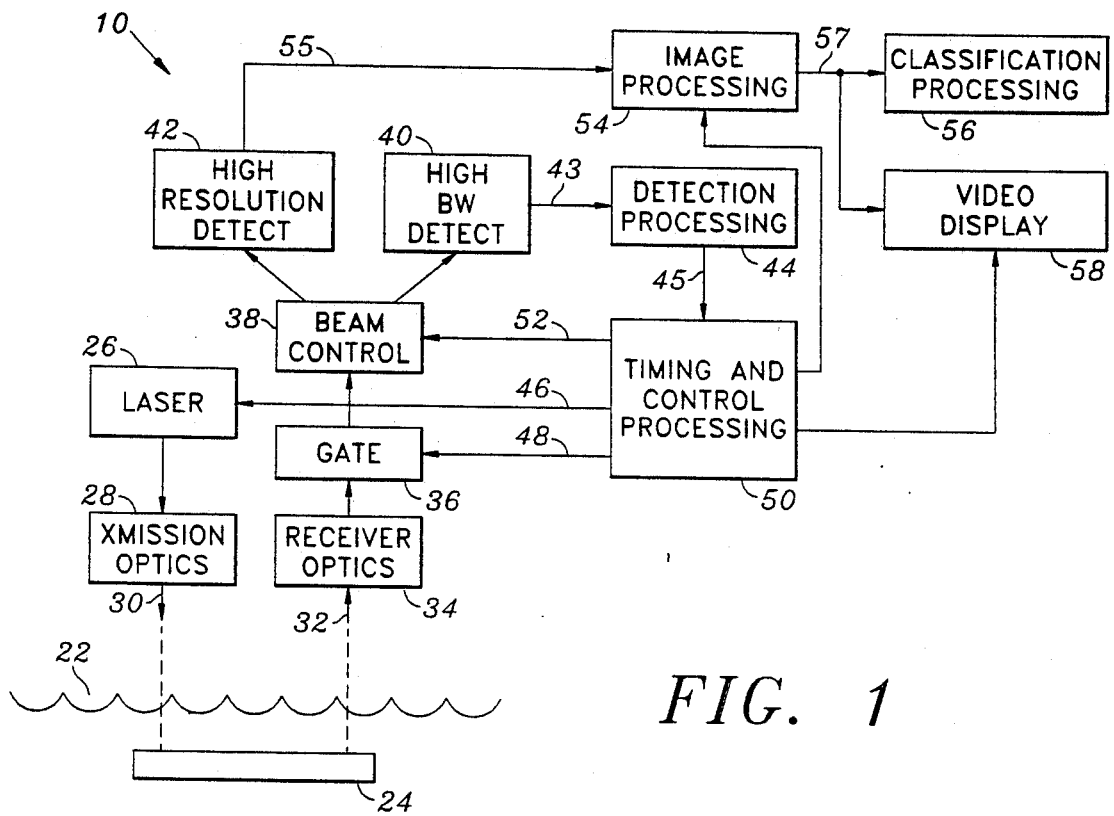
FIG. 1 is a block diagram of a dual detector LIDAR system made in accordance with the present invention.

Referring first to FIG. 1, there is shown a block diagram of a dual detector LIDAR system 20 made in accordance with the present invention. The LIDAR system 20 is typically carried in a suitable aircraft, not shown, above the surface of a body of water 22. An object 24 to be identified is located somewhere under the surface of the water 22. While the LIDAR system 20 is normally used to detect and classify objects that are underwater, it is to be understood that the invention may also be used to detect objects hidden in other transmissive mediums, or partially transmissive mediums, such as smoke, haze, fog, and the like.

As seen in FIG. 1, the LIDAR system 20 includes a laser 26 and appropriate transmission optics 28 for generating and transmitting a laser pulse 30 towards the surface of the water 22 where an object may be located. This surface area of the water (at which the laser pulse 30 is directed) may be referred to as a target area (because it is the target at which the laser pulse is directed), and the corresponding volume of water below the target area may be referred to as the target volume.

As the laser pulse 30 strikes the surface of the water, most of the laser energy contained therein continues to travel downwards through the water, although some is reflected from the surface of the water. As the laser pulse continues to propagate through the water, it is continually dispersed and absorbed by the water medium. If an object 24 is within the target volume, i.e., if an object is beneath the location whereat the laser pulse is directed, at least a portion of the laser energy contained within the laser pulse is reflected off of the surface of the object 24 and returned back to the LIDAR system 20. (It is noted that the transmitted laser pulse 30 and the returned or reflected laser pulse 32 are represented symbolically in FIG. 1 by the arrows 30 and 32, which appear as an output and input, respectively, of the LIDAR system 20.)

Due to the absorptive and dispersive nature of the media (both water and air) through which the transmitted laser pulse 30 and returned laser pulse 32 must travel, the amount of energy contained within the return pulse 32 may be orders or magnitude smaller than that contained in the transmitted pulse 30. Background energy originating from numerous sources, ranging from sunlight to various forms of electromagnetic radiation, will typically be much greater than the energy contained within the return pulse 32. All of this background radiation represents undesirable "noise" that interferes with the proper detection of the return pulse. It is thus a primary object of any LIDAR system to use a scheme or configuration for detecting the return pulse 32 that eliminates or minimizes the noise energy, while enhancing or amplifying the return pulse energy, thereby improving the signal-to-noise ratio (SNR).

As seen in FIG. 1, the LIDAR system 20 of the present invention receives the return laser pulse 32 in receiver optics 34. The receiver optics 34 include conventional lenses and filters that focus and filter the received optical energy. Advantageously, the filters used within such optics 34 filter out most of the background radiation having a wavelength that is significantly different than the wavelength of the transmitted laser energy. Hence, the use of such conventional filters greatly improves the SNR.

As an additional means for improving the performance of the LIDAR system, a timed gate 36, or equivalent shutter mechanism, is closed except during those times when a return pulse is expected. The use of such gate or shutter dramatically improves the lifetime of the detector components.

After passing through the gate 36, the energy contained within the returned laser pulse 32 (which at this point may be considered as a "beam") is steered by a beam control device 38 to one of a plurality of detectors. Two detectors are employed: a high bandwidth, low resolution detector 40; and a high resolution detector 42. Both detectors 40 and 42 include means for detecting the magnitude of the radiation energy that is incident thereon and generating an electrical output signal that is proportional to such magnitude. The "resolution" of the detector refers to the degree to which the detector is able to generate more than one output signal, with each signal being representative of the magnitude of the incident radiation falling upon a particular cross sectional area ("pixel") of the detector surface. The high bandwidth, low resolution detector 40 has a low number of pixels $N_L$, e.g., one to two hundred fifty-six (1 by 1 to 16 by 16); while the high resolution detector 42 has a high number of pixels $N_H$, where $N_H$ is greater than $N_L$.

Still referring to FIG. 1, the output signal(s) generated by the high temporal bandwidth, low resolution detector 40 is sent to appropriate detection processing circuitry 44 on signal line 43. The detection processing circuitry 44 electrically processes (amplifies, digitizes and filters) the detection signal 43 and makes a determination as to whether the processed signal contains a signature attributable to the presence of an underwater object 24. If so, a detection signal is generated and sent to a timing and control processing (TCP) circuit 50 over signal line 45. (It is noted that throughout this application a signal appearing on a given signal line may also be referred to by the same reference numeral as the signal line. Thus, for example, the detection signal appearing on signal line 45 may also be referred to as the detection signal 45.) Once a detection signal is generated, a beam control signal 52 is subsequently generated to thereafter direct the beam to the high resolution detector 42.

The output signals from the high resolution detector 42 are directed to image processing circuitry 54 over signal line 55. The image processing circuitry 54 enhances and processes the detector output signals 55 thus received in order to generate an image signal that is sent to a video display 58 and/or classification processing circuitry 56 over signal line 57. The video display 58, in turn, displays a video image representative of the information contained within the returned laser pulse 32 that is detected by the multiple pixels of the high resolution detector 42. Similarly, the classification processing circuitry 56 receives the image signal 57 and analyses it in order to classify and/or identify the type of object 24 that has been detected.

The TCP circuit 50 controls the operation of the LIDAR system 20, at least the operation relating to generating the transmitted laser pulse 30 and receiving and detecting the return pulse 32. To this end the TCP circuit 50: (1) generates an appropriate trigger signal that is sent to the laser source 26 over signal line 46 whenever a laser pulse 30 is to be generated; (2) generates an appropriate gate signal that is sent to the gate 36 over signal line 48 whenever the gate 36 is to be open; (3) generates an appropriate beam steering signal that is send to the beam control circuit 38 over signal line 52 in order to steer the beam received through the gate 36 to one of the two detectors 40 or 42; and (4) measures the time between transmitting a laser pulse 30 and receiving a detection signal 45 from the detection processing circuit 44 (evidencing the detection of a return pulse 32 by the high bandwidth, low resolution detector 44). In addition, the TCP circuit 50 may selectively compute the relative depth of the object 24 within the target volume based upon the measured "round trip" propagation time of the laser pulse as it travels to and from the object 24 being detected, and display the computed depth on the display 58. Further, the TCP circuit 50 synchronizes the operation of the image processing circuit 54 so that the image generated by such circuitry is displayed on the video display 58 at an appropriate time.

If three-dimensional imaging of the object 24 is desired, then various slices of the object are stored within the classification processing circuit 56, and once all such slices are stored, the processing circuit 56 then reconstructs the slices so as to produce a three-dimensional image of the object. Such three-dimensional imaging is explained more fully below.

Figure 2:
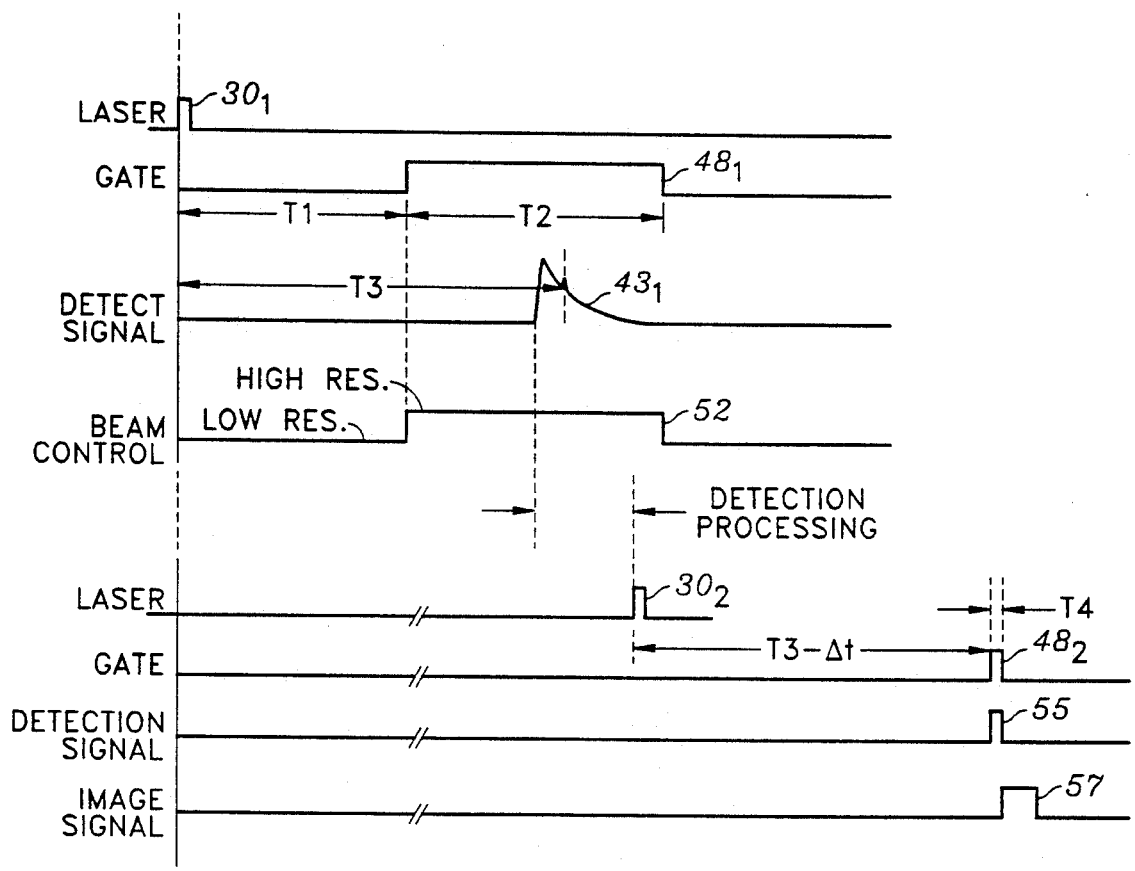
FIG. 2 is a timing diagram that illustrates the operation of the LIDAR system of FIG. 1.

Referring next to FIG. 2, a timing diagram is shown that illustrates the basic operation of the LIDAR system 20 of FIG. 1. As seen in FIG. 2, the operation begins with a "detection mode" of operation wherein a first laser pulse $30_1$ is generated. The first laser pulse directed to the target volume as described above. A first gate signal $48_1$ is then generated beginning at T1 seconds after the generation of the laser pulse $30_1$. The first gate signal $48_1$ has a duration of T2 seconds. (Note that T1 and T2, due to the propagation speed of the laser pulses, will have values on the order of tens or hundreds of nanoseconds.) The time T2 is selected to initially keep the gate 36 open for a sufficiently long period of time to allow a laser pulse to return from anywhere within the target volume.

For purposes of FIG. 2, when the gate signal 48 is high, the gate 36 (FIG. 1) is open and the received laser pulse is directed to an appropriate detector. The detector that receives the laser pulse is controlled by the beam control signal 52. When the beam control signal is high, the laser pulse is directed to the high bandwidth, low resolution detector 40. When the beam control signal is low, the laser pulse is directed to the high resolution detector 42. Thus, in FIG. 2, when the beam control signal is high, the beam is directed to the low resolution detector; and when the beam control signal is low, the beam is directed to the high resolution detector. For the example illustrated in FIG. 2, the beam control signal goes high substantially at the same time that the gate is initially open with the gate control signal $48_1$. This action directs any laser pulse received through the gate to the high bandwidth, low resolution detector 40.

Figure 2A:
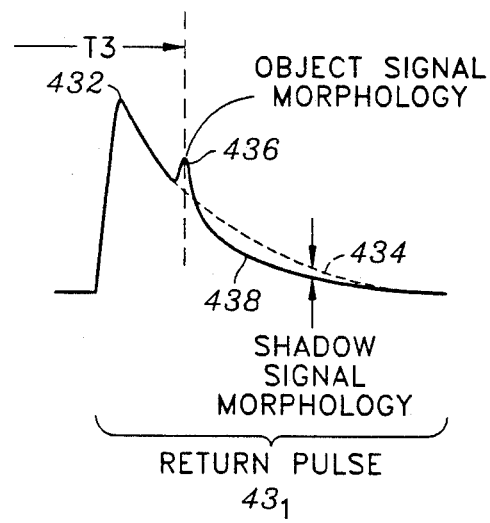
FIG. 2A is an enlarged portion of the return pulse shown in FIG. 2.

As illustrated best in FIG. 2A, such a laser pulse is received and detected by the high bandwidth, low resolution detector 40 after the generation of the initial laser pulse $30_1$. Such detection is manifest by an output signal $43_1$ from the high bandwidth detector 40 that rapidly rises to a maximum value or peak 432 immediately after the energy from the laser pulse first strikes the detector 40. The peak 432 represents the return from the water surface. The signal $43_1$ then slowly decays to zero as the energy associated with the increasing depths decreases due to the increased attenuation and/or scattering of the laser pulse path length.

If there is no object in the path of the laser pulse, then the return pulse $43_1$ decays to zero substantially as indicated by the dotted line 434. If, however, there is an object in the path of the laser pulse, then the return pulse $43_1$ includes a blip 436, which blip occurs at time T3 as measured from the generation of the laser pulse $30_1$. The blip 436 represents the return of laser energy from the surface of the object. The time T3 thus represents the round trip signal time for the laser energy associated with the pulse $30_1$ to travel to and return from the object 24. If a blip 436 is present, the return signal $43_1$ decays to zero as indicated by the solid line 438 in FIG. 2A. As will be appreciated by those of skill in the art, the difference between the signals 434 and 438 is attributable to the shadow of the object.

Thus, in summary, if the return signal $43_1$ contains a blip 436, that indicates a return signal morphology (shape) representative of a detected underwater object. A return signal $43_1$ having the correct morphology, including a blip 436, is said to contain a valid object signature or valid object morphology, and thus represents a valid return pulse. If the return signal $43_1$ does not contain a blip 436, that is indicative of a return signal morphology representative of the absence of an underwater object, and thus represents an invalid return pulse.

Referring back to FIG. 2, once the return of the laser pulse $30_1$ has been detected, the detection processing circuitry processes the detected pulse to confirm if it contains a valid object signature. Such processing is implemented using any suitable signal processing scheme capable of quickly determining if the return pulse contains a valid object signature or morphology. For example, the returned pulse $43_1$ may be analyzed using a full three dimensional maximum likelihood detection algorithm, based on principles described in Helstrom, Carl W., *Statistical Theory of Signal Detection* (Pergamon Press, 1968). If such processing confirms the presence of a valid object signature or morphology, within prescribed tolerances, then a "detection" is declared.

A preferred technique for processing the return pulse to determine if it contains a valid or invalid object signature is to capture the output signal from the high bandwidth low resolution detector(s) 40 during the entire time period T2, i.e., during the entire time that the detector 40 is gated ON. Such capturing can readily be accomplished using conventional analog signal holding techniques such as are commonly used in storage oscilloscopes to capture (store) and display an analog signal. Once such signal is captured, it is incrementally examined at designed time increments, e.g., every 10–30 nanoseconds. Each time increment represents a time slice of the return signal. Such time slices are best evaluated after digitizing the signal and using appropriate signal processing circuitry, although analog evaluation of the individual time slices may also be performed. A time-slice by time-slice evaluation of the captured signal in this manner thus provides multiple gate slices of the water column (target volume) through which the single laser pulse $30_1$ passes. As the multiple gate slices are examined, the standard likelihood detection processor techniques referenced above, or equivalent processing techniques, are used to quickly ascertain whether the signal for each slice represents a signal returned from an object and its shadow (and hence a "valid return pulse"), or a signal returned from something other than an object (and hence an "invalid return pulse"). Once a determination has been made that a valid return pulse has been received, the detection processor 44 alerts the TCP circuit 50 of such detection. The round trip signal time T3 is also noted, and passed on to the TCP circuit 50. Because of the low spatial resolution of the high bandwidth detector array, the number pixels which must be processed to achieve object detection is significantly reduced in comparison to the number required by previous LIDAR methods. This results in a corresponding reduction in signal processing load. It will be clear to one skilled in the art that the reduced spatial resolution in the detection phase does not result in an appreciable reduction in the detection SNR.

The TCP circuit 50, in response to being notified by the detection processing circuitry 44 that a valid return pulse has been received, and having been informed of the round trip signal time T3, begins a "classification mode" of operation. In the classification mode, a second laser pulse $30_2$ is generated and is directed at the coordinates of the target area where the object was detected during the detection mode of operation. During the classification mode of operation, the TCP circuit 50 generates a second gate signal $48_2$ that opens the gate 36 for a short time T4 that begins just slightly less than the time T3 (round trip signal time) after $30_2$ and that keeps the gate open for a time that ends just slightly after the time T3. At that time, the beam control signal 52 is low, so the return laser pulse received is directed to the high resolution detector 42. The high resolution detector responds by generating a detection signal 55 for each pixel thereof. The pixel signals are collectively processed in the image processing circuitry 54 in order to produce an image signal 57, from which an image may be displayed and/or object classification/identification may proceed.

Figure 3:
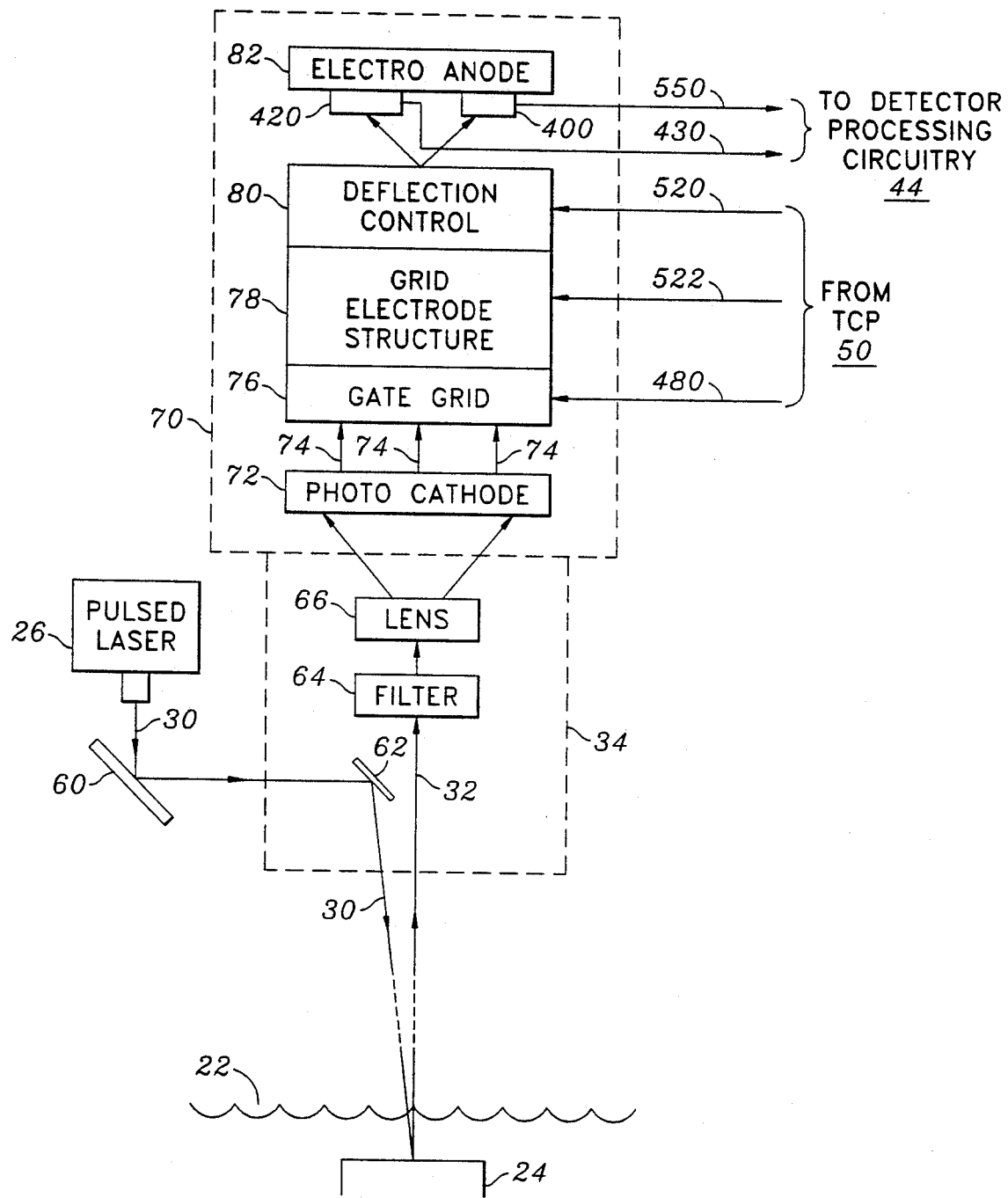
FIG. 3 is a block diagram of the transmission and detection portions of one embodiment of a dual detector LIDAR system.

Referring next to FIG. 3, a block diagram of the transmission and detection portions of one embodiment of a dual detector LIDAR system made in accordance with the present invention is illustrated. In accordance with this embodiment, a pulsed laser source 26 generates a laser pulse 30 that is reflected from mirrors 60 and 62 and directed downwardly toward the surface 22 of a body of water. An object 24 underneath the surface of the water reflects a return pulse 32 (comprising a portion of the pulse 30) back to a bandpass filter 64. The bandpass filter 64 is selected to pass a narrow band of wavelengths that are centered about the wavelength of the pulse laser source 26. Wavelengths not within the pass band are greatly attenuated by the filter 64. The return pulse 32, after passing through the filter 64, is directed to a lens assembly 66. The lens assembly 66 focuses the return pulse to the front end of a dual detector digicon tube 70. The digicon tube 70 is described more fully below.

A digicon tube is a form of vacuum tube detector that converts optical input signals to electrons, which electrons are then electrostatically accelerated, and electrostatically or magnetically focused, producing an amplified electrical output image signal that is proportional to the optical input image signal. Digicon tubes are known in the art. See, e.g., Tull, et al. "Self-Scanned Digicon: a Digital Image Tube for Astronomical Spectroscopy," *Applied Optics*, Vol. 14, No. 5, pp. 1182–89 (May 1975); Choisser, John P., "Detecting Photoelectron Images with Semiconductor Arrays for Multichannel Photon Counting," *Optical Engineering*, Vol. 16, No. 3, pp. 262–66 (May–June 1977).

As seen in FIG. 3, the digicon tube 70 used in connection with the present invention, unlike digicon tubes known in the art, advantageously includes two detectors: a high resolution detector 420, and a low resolution detector 400. The optical input signal, i.e., the return pulse 32 that is received by the receiver optics 34, is focused on a photocathode 72. The photons of the return pulse which are captured by the photocathode 72 cause electrons to be emitted, which electrons may be considered as an electron beam, and are represented in FIG. 3 by the arrows 74 (hereafter the electron beam 74). The electron beam 74 passes through a gate grid 76, and is accelerated and focused by a grid electrode structure 78. While being accelerated, the electron beam 74 may be deflected by a deflection control device 80 to one of the two detectors 400 or 420. These two detectors form part of, or are affixed to, an electroanode 82.

Each detector 400 or 420 is divided into a plurality of pixels. The detector 400 is a low resolution detector, and as such includes only a small number of pixels $N_L$, e.g., an array of 1–256 pixels. The detector 420, on the other hand, is a high resolution detector array and thus includes a large number of pixels $N_H$, where $N_H > N_L$. An electrical output signal is generated for each pixel of each detector. The output signals from the low resolution detector are hereafter referred to collectively as the low resolution detector output signal 430. Similarly, the output signals from the high resolution detector are hereafter referred to collectively as the high resolution detector output signal 550. For each pixel of each detector, the signals comprise an electrical signal that has a magnitude proportional to the magnitude of the electron beam that strikes that particular pixel. As seen in FIG. 3, the output signals 430 and 550 are directed to the detector processing circuitry.

The photocathode 72 and the electroanode 82, and all the elements in between, are housed in a tubular housing, described more fully below in connection with FIG. 5. The interior of the housing is evacuated to form a vacuum, so that the digicon tube 70 is properly considered as one type of vacuum tube and the electron beam 74 may be controlled using conventional vacuum tube technology. Thus, the photocathode 72 is biased at a potential that is negative relative to the electroanode 82 and electrons emitted at the photocathode 72 are attracted towards the more positive electroanode. The gate grid 76 may be selectively biased by an appropriate gate signal 480 so as to allow the electrons to pass or not to pass therethrough. The electrons that pass through the gate grid 76, if any, may be controllably accelerated towards and focused at the electroanode 82 by applying an appropriate control signal 522 to the grid electrode structure 78. The electrons may also be deflected to either the low resolution detector 400 or the high resolution detector 420 by applying an appropriate beam control signal 520 to the deflection control device 80.

A comparison of the dual detector digicon tube 70 shown in block diagram form in FIG. 3 with the generalized block diagram of the invention shown in FIG. 1 reveals that the gate grid 76 of the digicon tube 70 serves the function of the gate 36 shown in FIG. 1. Similarly, it is seen that the deflection control device 80 of the digicon tube 70 serves the same function as the beam control apparatus 38 shown in FIG. 1. Likewise, it is seen that the detectors 400 and 420 used within the digicon tube 70 perform the same function as the high bandwidth, low resolution detector 40 and the high resolution detector 42, respectively, of FIG. 1.

Figure 4:
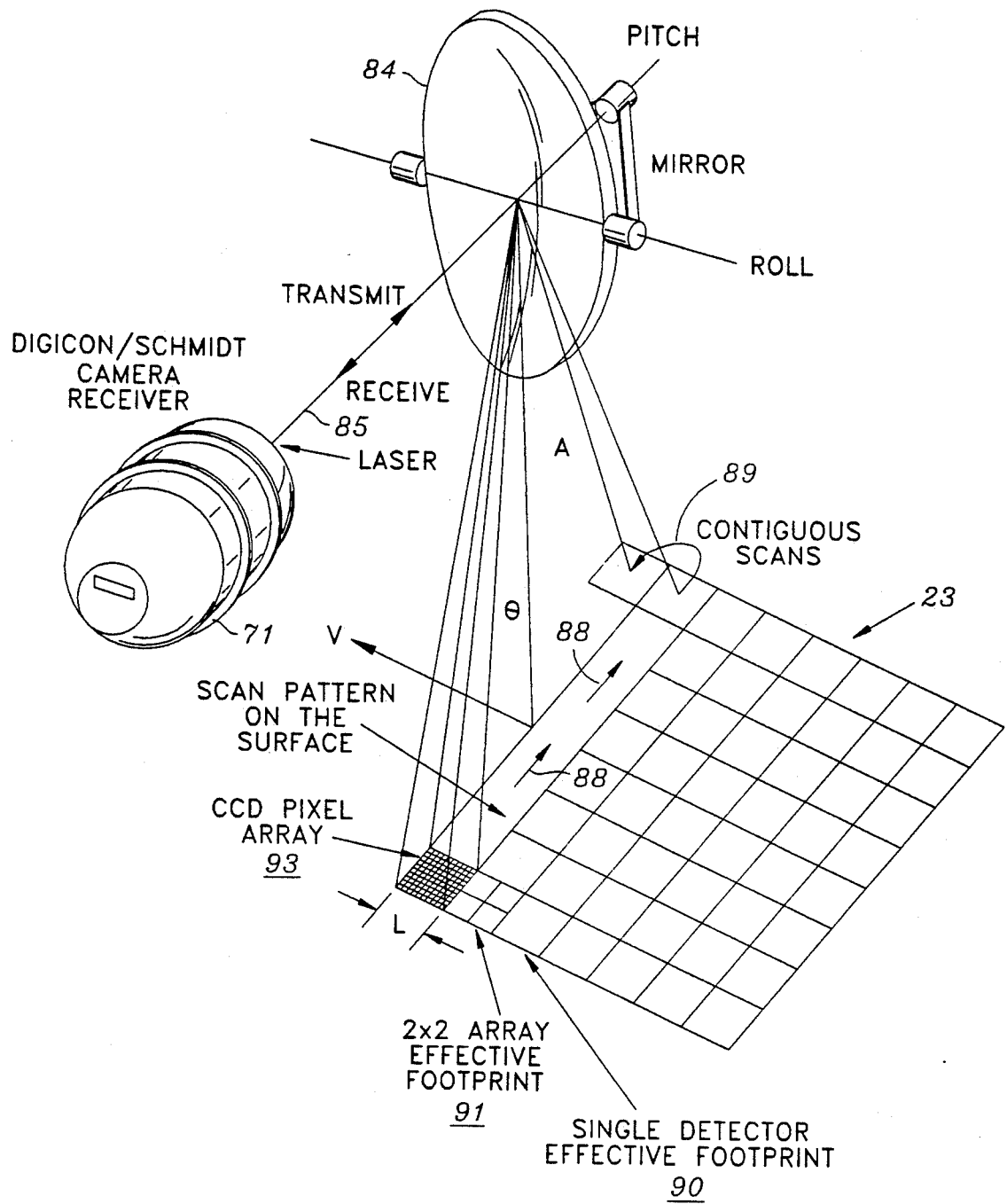
FIG. 4 is a schematic diagram that illustrates the use of a dual detector LIDAR system to scan a large target area.

Through the use of a dual detector digicon tube 70, or other dual detector structure as shown in FIG. 1, the LIDAR system of the present invention may be used to efficiently scan a target area for the presence of objects. This scanning process is schematically illustrated in FIG. 4. As seen in FIG. 4, a dual detector assembly 71 includes the circuitry shown in FIG. 3, or equivalent, as well as control/processing electronics. The dual detector assembly 71, in combination with a pivotable scan mirror 84, are carried above a target area 23 by a suitable aircraft. The mirror 84 includes conventional means for adjusting its pitch and roll relative to a beam axis 85 of the assembly 71. Hence, for a particular adjustment of the pitch and roll of the mirror 84, a laser pulse is directed along the beam axis 85 to or from a particular segment 86 of the target area 23. By using conventional means to adjust the roll and pitch of the scan mirror 84, the laser pulse can thus be directed to, and received from, any desired segment of the target area 23.

For a typical scan operation, the mirror 84 is controlled such that at one instant of time, the laser pulse is directed to and received from a particular segment 86 of the target area. (For purposes of the present scanning description, it is to be understood that only one laser pulse is usually directed to and received from each target area segment, the first pulse being sent during a detection mode of operation; and that a second pulse is sent only during a classification mode of operation, i.e., only if the first pulse detects that an object is present within the target volume, thereby enabling both the target location and target image to be determined as previously described.) At a following instant of time, the mirror is adjusted so that the laser pulse is directed to and received from an adjacent segment of the target area. In this manner, the target area is scanned by sequentially directing the laser pulse to, and receiving the returned laser pulse from, adjacent target segments. For example, a scan pattern might include vertically proceeding up a column of target area segments, as suggested by the arrows 88 in FIG. 4, and at the top of the column, shifting to an adjacent column of segments, as suggested by the arrow 89, and then vertically scanning down the adjacent column. Other scanning patterns could, of course, also be used, such as scanning horizontally across adjacent rows of segments of the target area.

Whatever scanning pattern is used, FIG. 4 illustrates how each segment of the target area 23 may be examined by the low resolution detectors 40 or 400, or the high resolution detectors 42 or 420, of FIGS. 1 and 3. The return laser pulse 43 from the initial laser pulse $30_1$ (FIG. 2), for example, is directed to the low resolution detector. Such low resolution detector may include a single detector, i.e., a single pixel, in which case the effective "footprint" of such single detector relative to a given segment of the target area 23 is as shown at segment 90. This means that such single detector is only capable of detecting a laser return pulse from somewhere within the segment 90. In contrast, if the low resolution detector includes a 2×2 array of detectors, i.e., four pixels, the effective "footprint" of such four pixel detector at a given segment of the target area 23 is as shown at segment 91. This means that such four pixel detector is capable of detecting a laser return pulse from any of the four quadrants of the segment 91.

The high resolution detectors 42 or 420 advantageously include a large array of detectors, such as is available from a charge coupled device (CCD) array, and can thus detect returned light from any of a large number of pixels. Such a multiple pixel detector has an effective "footprint" at a given segment of the target area 23 as shown at segment 93. This means that the high resolution detector is capable of detecting a laser return pulse from any of the small grids within the segment. Thus, in operation of the LIDAR system, the low resolution detector is first used to identify if an object is present within a given segment of the target area. If so, the high resolution detector is then used to provide a better "look" at the object, i.e., to provide a rough image of the object, whereby a determination can be made as to the relative size of the object compared to the size of the target area segment, as well as an approximation of the object's shape (rectangular, circular, etc.). Such information may then be used to classify or categorize the object, from which classification and/or categorization, a positive identification of the object may be possible.

In accordance with another important feature of the invention, a three-dimensional image of the object may be generated in order to further help identify and/or classify the object. Such three-dimensional image is made by vertically examining the object, once detected, slice by slice. This is readily accomplished by generating additional laser pulses, directing such pulses at the target area where the object has been detected, and adjusting the gate time (T3±Δt, see FIG. 2)) by an incremental amount after each pulse, so that the return pulse corresponds to a different vertical slice of the object. For example, by knowing the velocity of the transmitted and return pulses, it is possible to increment the gate time (which may be considered as a "wait time", i.e., it is the time that one waits after the generation of the laser pulse before gating ON the detector) by an amount that corresponds to a vertical distance of approximately 1 m, or other appropriate distance. The image of the object at 1 m increments (or other selected distance) may thus be obtained. The image of each slice is stored, and additional slices are examined, each with a slightly different gate time. When all the slice images have been obtained, they are combined, using conventional computer aided design (CAD) display techniques, or equivalent display techniques, to create a three-dimensional image of the detected object.

Thus, for example, if the object is a sphere, a first slice of the object would appear as a small circle, whereas a second slice of the object (at a slightly deeper vertical distance) would appear as a larger circle. A third slice would appear as an even larger circle, and the slices would continue to increase in size up to the full diameter of the object. After the full diameter is imaged, all further slices would be the same size, and the shadow of the spherical object would begin to appear as the depth of the slices increased.

Similarly, other recognizable patterns exist for other shaped objects whereby each slice takes on a slightly different size and shape, depending upon the object's basic shape and orientation relative to the incident laser pulse. For example, a cube, having one of its corners pointing up, would have an image slice pattern, for increasingly deeper slices, comprising increasingly larger squares, up to maximum size square, which maximum size square would represent the size of the cube at its widest point. The ability to synthesize a three dimensional image depends on the transmitted pulse length at the object depth. As the pulse length increases due to multiple scatter induced pulse stretching on the downwelling path, the ability of the LIDAR system to resolve detail in the z dimension will decrease.

Because the object casts a shadow in the upwelling laser light returned from water slices below the object, the shadow of the object is also detected as the LIDAR system looks at deeper and deeper slices. It is noted that the shadow signature morphology changes as the depth of a given slice below the object depth increases. Multiple shadow slices can be collected to exploit the increased object information contained in this depth dependent signature. Alternatively, a single "thick" shadow gate can be collected by turning the gate on a short distance below the object and turning the gate off only after the shadow signature contrast has become negligibly small. While this latter procedure reduces the time to collect the shadow signature, some signal bearing information will be lost.

Advantageously, the processor that examines and reconstructs the image from the respective slice data is programmed to recognize that the returned image will include not only the object surface, but also any shadow cast by the object. Thus, the processor looks for various patterns, such as increasing object size up to a maximum size, and is thus able to efficiently postulate what type of three-dimensional object shape and orientation would likely provide the combined image and shadow that has been detected.

While three-dimensional imaging requires additional laser pulses, and hence slows down the scan rate of the target area and requires the expenditure of additional energy, it is to be emphasized that such three-dimensional imaging need only be invoked when a particular object cannot otherwise be identified or classified from the two-dimensional image of the object obtained from a single classification pulse. Advantageously, many objects will be classifiable from a two dimensional image of the object surface, e.g., by simply examining the size and shape of the image. For those objects that are not identifiable from such a two-dimensional image, then additional classification laser pulses can be generated, to look at further vertical slices of the object, thereby providing a rough three-dimensional look at the object.

Figure 5:
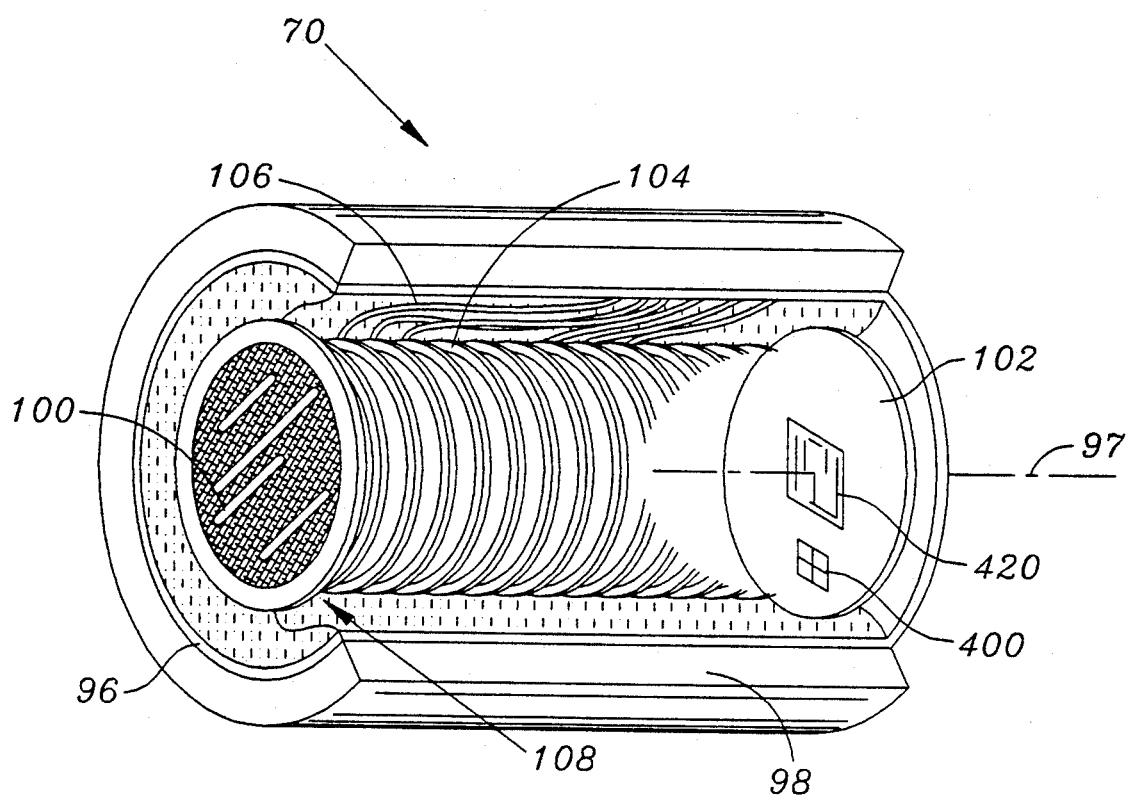
FIG. 5 shows a dual detector digicon made in accordance with the present invention.

Referring next to FIG. 5, there is shown a cut-a-way view of a preferred construction of a dual detector digicon tube 70 made in accordance with one embodiment of the present invention. Such construction includes a tubular housing 96 having a central longitudinal axis 97. The tubular housing is surrounded by a magnetic deflection coil 98, which coil is wound substantially the same way as is one set of the deflection coils (e.g., the vertical sweep coils) placed around the yoke of a conventional CRT (cathode ray tube). At one end of the tubular housing is a circular blue enhanced, negative electron affinity GaAs or GaAs phosphide photocathode 100. At the other end of the tubular housing is an anode plate 102 that includes two detectors mounted thereon. The first detector 420 comprises a CCD array-thinned backside bombarded detector that is mounted on the anode plate so as to be aligned with the longitudinal axis 97 of the tubular housing. The detector 420 may thus be said to be "on-axis". Further, it is noted that the detector 420 is mounted so that its thinned backside faces the electron beam, i.e., the detector is mounted backwards or up-side-down from how a CCD detector array is normally mounted. The second detector 400 comprises a high bandwidth PIN or APD diode array detector. A 2×2 array is illustrated in FIG. 5, but this is only exemplary. As indicated previously, the diode array may include a single (one) array, up to a 16×16 array. The detector 400 is positioned below (or to the side) of the detector 420, and is thus said to be "off-axis".

An accelerator/focus grid electrode structure includes a plurality of spaced apart grid rings 104 between the photocathode 100 and the anode plate 102. By applying an appropriate biasing potential between selected ones of the grid rings, the electron beam flowing between the cathode and anode can be controllably accelerated and focused. The biasing potential is different depending upon the operating mode of the LIDAR system. Thus, for example, during the detection mode of operation, when the deflection coil is in an "ON" state, the potential applied to the grid rings images the photocathode onto the low resolution detector 400. If more than one pixel (detection element) exists in the low resolution detector 400 the imaging is performed so as to preserve the photocathode image information at the detector 400. If, however, only a single detection element exists in the low resolution detector 400, then the photocathode is simply mapped onto the single detector without the requirement to preserve photocathode image information.

During the classification mode of operation, when the deflection coil is in an "OFF" state, a second set of potentials are applied to the grid rings 104 so as to image the photocathode onto the high resolution detector 420 in the center (on-axis) of the anode plate 102. Advantageously, during the classification mode of operation, the beam can be focused such that the entire photocathode image is focused onto the surface area of the high resolution detector 420, or so that only a portion of the photocathode image is focused onto the surface area of the high resolution detector 420. The focusing ability thus provides the equivalent of a "zoom" capability, referred to hereinafter as "electrostatic zoom", wherein the effective pixel size on the photocathode may be selectively adjusted over a range on the order of 10-to-1. High voltage wires 106 are used as required in order to make respective electrical contact with the grid rings 104. It is also possible to provide this zoom image magnification capability with magnetic lenses placed between the above end of the tube and the detector array. Magnetic image magnification is capable of higher magnifications (i.e., 40). When used in combination with a magnetic focusing coil around the tube, this approach also provides higher image resolution than the electrostatic approach. This improved performance is achieved at the expense of increased system size and weight.

A gating/gain control grid 108 is located immediately behind the photocathode 100. The grid 108 is not readily visible in FIG. 5. A non-conductive potting compound 110 is inserted within the housing 96 to fill in the annular volume space between the grid rings 104 and the tubular housing 96.

In addition to the detection and classification modes of operation, the invention may also operate in a surface flash detection mode. In this mode, the photocathode gating grid 76 is biased to produce low tube gain. The deflection coil 80 is activated to deflect the electron image of the photocathode to the low resolution detector 400, and the grid rings 104 are biased to provide electron image magnification appropriate to the size of a submerged object of interest. The LIDAR operates in the surface flash mode until such time as the surface flash (the return pulse from the surface of the water 22) is detected.

Upon detection of the surface flash, the gating grid 108 is biased on to the full gain mode of operation, and operation in the detection mode begins. During the detection mode, LIDAR data is thus collected by the high bandwidth low resolution diode array 400. Once a valid return pulse is detected, and appropriately processed by the detection processing circuit 44, thereby signaling object detection, the gate grid 108 is gated totally off, and a timing signal is generated to allow the gating grid to be turned ON with the next laser pulse at the gate time which coincides with the object depth.

The classification mode begins when the deflection coil 98 is deactivated and the grid rings 104 are adjusted to image the photocathode at the appropriate magnification onto the CCD array detector 420. At the appropriate gate time, the gate grid is turned ON, allowing a range gated image of the object to be collect by the CCD array detector 420. The image is then available for automated processing or human observation. With an inertially stabilized, gimballed scanning mirror 84 (FIG. 4), multiple images may be generated with multiple laser pulses in order to improve the image SNR by integration. Alternatively, such multiple images may be used to construct a mosaic view of larger objects which cannot be fully imaged with a single pulse.

In operation, the dual detector digicon tube construction shown in FIG. 5 advantageously allows the incoming optical beam (return pulse) to be focused over the relatively large surface area of the GaAs photocathode 100. Electrons are emitted from the back side of the photocathode 100 in proportion to the intensity of the incoming optical beam. The electrons are attracted towards the anode plate 102, being accelerated and/or focussed along the way by the grid rings 104. In the absence of a magnetic field, the electrons travel straight towards the anode plate 102, in parallel with the longitudinal axis 97, and strike the CCD array detector 420. That is, during the classification mode the deflection coil is in an off state so that the photoelectron image generated by the photocathode may be electrostatically imaged onto the CCD array 420. If a magnetic field is present, the electrons are deflected off the axis 17, causing them to strike the low resolution detector 400. The presence of the magnetic field is readily controlled by simply applying an appropriate current to the magnetic deflection coil 98.

The dual detector digicon tube construction of FIG. 5 advantageously provides an electrostatically focused digicon tube having numerous features. For example, the digicon tube provides a blue enhanced, negative electron affinity GaAs or GaAs phosphide photocathode 100 with a quantum efficiency of up to 40% when the gating grid is properly biased to provide the required photocathode enhancing field. Such a GaAs photocathode may be realized using commercially available GaAs wafers, as are commonly available from Intevac Corporation, of Palo Alto, Calif.

Another feature of the dual detector digicon is that the grid 108, located immediately behind the photocathode and used to generate the photocathode enhancing field, also allows the digicon tube to be gated on in less than 10 nanoseconds. The grid may also be biased to effectively control the tube gain, i.e., to provide a sensitivity control. This feature is useful during both the detection and classification modes of operation. The grid may be constructed using conventional vacuum tube fabrication techniques.

A further feature of the dual detector digicon is that the electroanode 102 incorporates two detectors 420 and 400. As indicated above, the detector 420 is a thinned, backside bombarded CCD array which occupies the space in the center of the anode header (plate). The CCD frame readout rate may be advantageously varied to accommodate the object size, i.e., for the small shallow objects to larger deep objects the frame rates may range from a few Hz up to 200 Hz, while for very small shallow objects, the frame rates may go up to the Khz range. CCD arrays, and their operation, including backside bombarded operation, are known in the art. Such arrays can be purchased from numerous vendors, such as Tektronix, of Beaverton, Ore.

The detector 400 is a high bandwidth silicon diode or avalanche diode array which occupies an off-axis portion of the anode header space not occupied by the CCD array 420. Such diode arrays are also commercially available from numerous vendors, such as Antel, of Toronto, Canada.

It is noted that with the CCD incorporated in the center of the anode plate 102, it is possible to perform pixel binning to increase the effective pixel size. Pixel binning is the electrical joining or binding together of adjacent pixels, thereby increasing the effective pixel size. Pixel binning may be desired where a large object needs to be classified. For example, by using pixel binning, and assuming a pixel size of 25 microns on the CCD detector 420, a 4×4 binning results in an effective pixel size of 100 microns.

Advantageously, the dual detector digicon shown in FIG. 5 may have both the CCD array 420 and the high bandwidth diode array 400 operate in the electron bombardment in silicon (EBS) gain mode. Such EBS gain mode provides low-noise amplification with a noise factor close to 1.0. In contrast, conventional microchannel plate (MCP) gated intensifiers are noisy devices with noise factors approaching 3.0. See, e.g., Ginaven et al., "State-Of-The-Art Space Telescope Digicon Performance Data," *SPIE* (Society Photo-optical Instrumentation Engineers), Vol. 217, Advances in Focal Plane Technology, pp. 55–68 (1980).

It is noted that other arrays, besides a CCD array, could be used as the high resolution detector. For example, RETICON, of Sunnyvale, Calif. (Western Regional Sales Office), makes diode arrays that include a large number of diodes in a small space. Such an array, or equivalents thereof, could be used with the present invention as the high resolution detector. There are also charge storage arrays known in the art that provide a very high bandwidth, e.g., greater than 100 Hz. Such charge storage arrays may be used with the present invention as the high resolution detector in lieu of, or in conjunction with, the diode arrays previously described.

The small pixel sizes normally associated with CCD arrays usually dictates that the receiver optics have a relatively short focal length in order to produce the large pixel sizes desired for the classification of large objects. Even with short focal length receiver optics, i.e., 3.5 cm, some CCD pixel binning may be required. To maintain the required image resolution over a wide instantaneous field of view, the receiver optics F-number must be no lower than about 1.0. This implies that the receiver aperture size is severely limited, thereby limiting light-gathering power and, consequently, image signal-to-noise ratio (SNR). Moreover, to generate the desired wide range of pixel sizes with the conventional gated intensified CCD array, it is desired to incorporate a zoom capability into the receiver optics. The zoom capability would normally place a further constraint on the maximum receiver aperture size. Advantageously, however, because the present invention provides the ability to perform pixel binning in combination with electrostatic zoom, such constraints are substantially removed. That is, when CCD pixel binning is combined with electrostatic zoom magnification in a dual detector digicon tube as described above, the full range of desired pixel sizes can be generated with a fixed focal length receiver optical system. Furthermore, the focal length of the optical system can be considerably longer, i.e., on the order to 20 cm, leading to a significant increase in the aperture size for an F-1 optical system. For example, by increasing the focal length from 3.5 cm to about 20 cm, the receiver aperture area may increase by a factor of about 32, leading to a corresponding increase in image SNR of approximately 15 Db over that produced by a conventional gated CCD camera.

Figure 6:
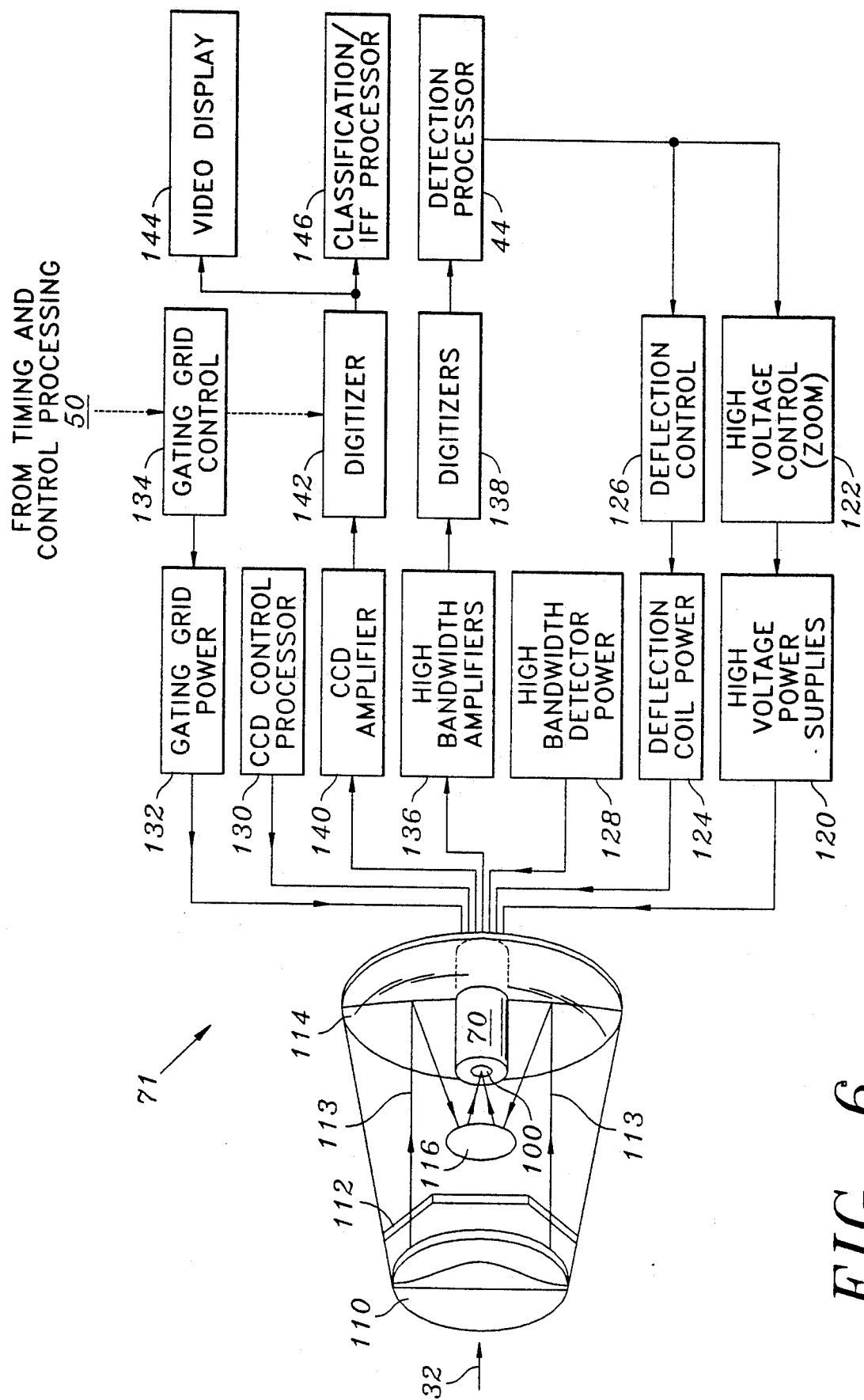
FIG. 6 shows a diagrammatic representation of the receiving optics portion of one embodiment of the present invention, and includes a block diagram of the detection and image processing circuitry.

Referring next to FIG. 6, there is shown a schematic diagram of one embodiment of a dual detector assembly 71 made in accordance with the present invention, including a block diagram of the various electronic control and processing circuits that are used with such an assembly. Not shown in FIG. 6 are the laser pulse generator and transmission optics, which may be conventional. The assembly 71 includes a dual detector digicon tube 70 which is as described above in connection with FIGS. 3 and 5. The receiving optics portion of the assembly 71 includes a Schmidt camera that receives the incoming return pulse 32 from the target area. The design and use of Schmidt cameras is known in the art. See, e.g., Miczaika, G. R. and Sinton, W. M., *Tools of the Astronomer* (Harvard University Press, 1961).

Either in front of, or behind, the Schmidt corrector plate 110, is a filter assembly 112. Preferably, such filter assembly 12 allows the respective filter elements to be selectively folded into or out of the optical path. Such folding may be readily accomplished by using a spider-like frame, with filter segments mounted between pivotable legs of the frame. The purpose of the filter 112 is as previously described in connection with the filter 64 of FIG. 3.

The incoming optical light that passes through the corrector plate 110 and the filter 112, represented by the ray trace lines 113, is directed to a primary spherical mirror 114. Such light reflects off of the primary spherical mirror 114 to a secondary folding mirror 116. The light reflects from the secondary folding mirror 116 to one end of the digicon tube 70, and strikes the photocathode 100 thereof.

The control and processing circuits needed to operate the digicon tube 70 are as shown in FIG. 6. Basically, such circuits include a first power supply 120, or more properly a high voltage supply 120, for providing a voltage potential between the photocathode 100 and anode plate 102 (see FIG. 5), as well as for providing appropriate voltage potentials to the ring grids 104. The high voltage supply 120 is controlled, as required by a high voltage control circuit 122, which control circuit 122 primarily adjusts the grid potential so as to control the electrostatic zoom function of the digicon tube.

A second power supply 124 is also provided for powering the deflection coil 98. The power supply 124 is controlled (turned ON and OFF) using a deflection control circuit 126. A third power supply 128 provides power to the diode array used as the high bandwidth detector 400. Power is provided to the CCD high resolution detector 420 through a CCD control processor 130. The control processor 130 also provides the needed control signals for operation of the CCD detector 420.

A fourth power supply 132, termed "gating grid power" in FIG. 6, provides input power to the gate grid 108 so as to selectively open or close the gate, i.e., to block or let pass the electron beam flowing between the photocathode 100 and anode plate 102. The gating grid power source is controlled by a gating grid control circuit 134. The gating grid control circuit 134, in turn, is triggered by a trigger signal received from the timing and control processing (TCP) circuit 50 (shown in FIG. 1). This is done so that the gate grid can be opened at the appropriate time as indicated in the timing diagram of FIG. 2.

The output signals generated by the low resolution diode array detector 400 are directed to high bandwidth amplifiers 136. The amplified output signals are then digitized by a digitizer 138, and the resulting digital signal is then passed to a detection processor 44. The detection processor 44 determines whether the signal thus received is a valid return signal. After determining that a valid return signal has been detected by the array detector 400, the detection processor 44 signals the deflection control circuit 126 that the electron beam or current in the digicon tube 70 need no longer be deflected off-axis to the low resolution detector 400. Similarly, the detection processor 44 signals the zoom control 122 so that the beam is electrostatically zoomed a desired amount on-axis to the high resolution CCD detector 420.

The output signals from each pixel of the CCD high resolution detector 420 are amplified by a CCD amplifier circuit 140. These signals are then also digitized by a digitizer circuit 142. Once digitized, the signals are sent to an optional video display 144, and/or to a classification processor 146. The classification processor 146 preferably includes the ability to identify whether a particular detected object belongs to a "friend" or a "foe" (referred to in FIG. 6 as IFF, for "identify friend or foe").

Advantageously, the classification processor 146 includes sufficient memory and processing ability to keep track of different object shapes and images, and to make a determination as to the particular type of object that has been detected. Further, as explained previously, it includes sufficient processing capacity to reconstruct vertical slices of a detected object in order to create a three-dimensional image of the object. Such processor may be any of a number of conventional array processors available from numerous vendors, such as Data Cube, of Peabody, Mass. Conventional processing techniques are used to display, classify and/or reconstruct the image once the image signal has been obtained from the CCD array detector 420.

It is noted that the digitizers 138 and 142 may be of conventional design, e.g., a commercially available analog-to-digital converter. The strobe or trigger signals used with such digitizers are obtained from the TCP circuitry 50, which signals are timed to coincide with, or be a controlled delay from, other key events of the LIDAR operation.

It is further noted that the power supplies and amplifiers shown in FIG. 6 may also be of conventional design.

Figure 7B:
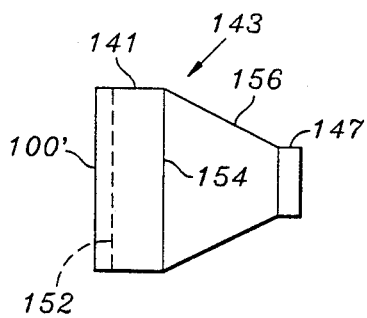
FIG. 7B diagrammatically illustrates an intensified gatable CCD camera that may be used to replace the CCD digicon in FIG. 7A.
Figure 7A:
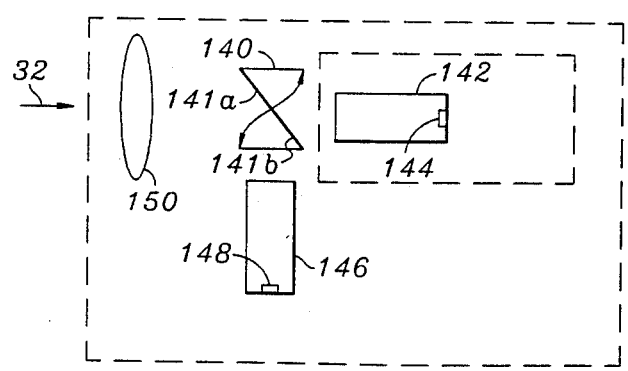
FIG. 7A is a block diagram of a folding mirror embodiment of the present invention wherein two different types of digicons, one having a CCD array and one having a diode array, are used.

Referring next to FIG. 7A, an alternative embodiment of the dual detector LIDAR system is shown in block diagram form. Such alternative embodiment utilizes a folding mirror 140 and two digicons. A first digicon 142 has a CCD array 144. A second digicon 146 includes a diode array 148. An optics assembly 150 receives the incoming optical return pulse 32 and directs it to the digicon 146 by way of an optical path that reflects off of the folding mirror if the folding mirror is folded out, as shown in FIG. 7A. If, however, the folding mirror 140 is folded in (with each half of the mirror being folded to be horizontal, as oriented in FIG. 7A, then the received optical return pulse is directed to the digicon 142.

As thus described, it is seen that the embodiment shown in FIG. 7A involves generating two separate focal planes using common receiver optics 150. These two image planes are generated through use of the removable path folding mirror 140. The high bandwidth diode array detector 148 occupies one image plane; while a CCD array 144 within the digicon 142 occupies the other image plane. Switching between the two detectors requires that the mirror 140 be switched in and out of the optical train. This is preferably accomplished using a hinged two-segment mirror 140 as shown in FIG. 7A. As seen in FIG. 7A, the mirror is split into two segments 141a and 141b, each of which swings about respective pivot points. To achieve a large pixel size, desired in the classification mode for large objects, the thinned, backside bombarded CCD array 144 is incorporated into a zoomable GaAs digicon. If CCD pixel binning is sufficient to generate the desired range of pixel sizes in the classification mode, then image zoom is not required. Alternatively, zoom capability may be incorporated in the receiver optics at the expense of increased complexity and reduced receiver aperture.

FIG. 7B diagrammatically illustrates a intensified gatable CCD camera 143 that may be used in lieu of the digicon 142 used with the folding mirror embodiment shown in FIG. 7A. The CCD camera 143 includes a tubular housing 141 having a GaAs photocathode 100' at one end thereof onto which the input optical signal is focused. The photocathode 100' may be realized from a GaAs Gen III wafer having a phosphor anode 154. The photocathode 100' converts the optical signal to an electron beam that is attracted towards the phosphor anode 154. Behind the photocathode 100' is a gating grid 152. The phosphor anode 154 is then coupled to a CCD array 147 by a minifying coupler 156. Such gatable CCD cameras are known in the art and are available commercially from numerous vendors, such as Xybion of San Diego, Calif.

Figure 8:
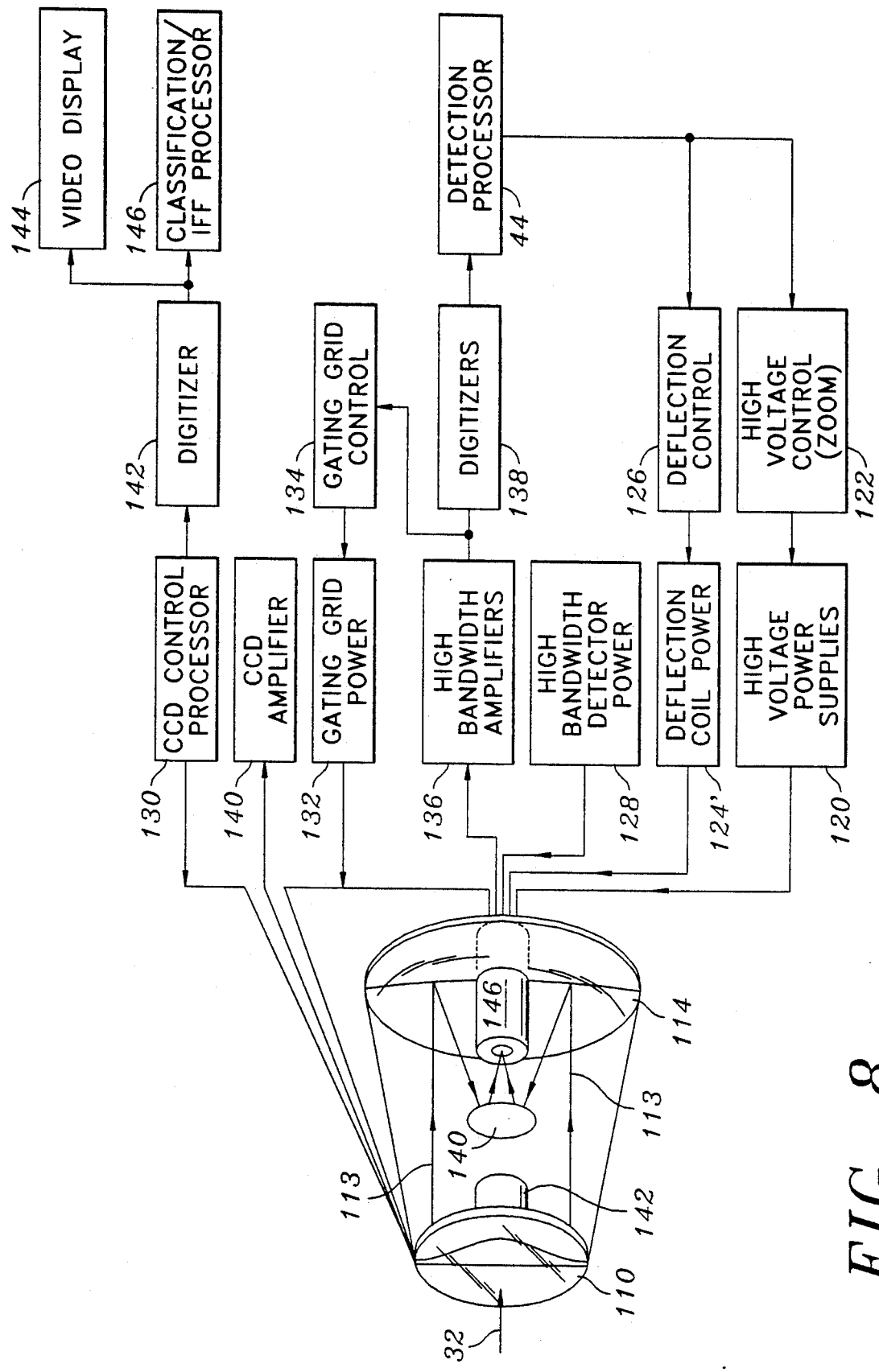
FIG. 8 is a diagrammatic representation of the receiving optics portion of the folding mirror embodiment of the invention, and includes a block diagram of the detection and image processing circuitry used with such embodiment.

A practical realization of the folding mirror embodiment of the invention is shown in FIG. 8. As seen in FIG. 8, the receiver optics are similar to that which is shown in FIG. 6. That is, a Schmidt camera 110 receives the incoming return pulse 32 from the target area. Ray trace lines 113 represent this return pulse after it has passed through the corrector plate 110 (and a filter, not shown in FIG. 8). The light is directed to a primary spherical mirror 114 and reflected to a removable secondary folding mirror 140. If the LIDAR system is operating in a detection mode, then the folding mirror 140 is folded into place, and the light is directed to the digicon 146, which includes a high bandwidth, low resolution detector 148. If the LIDAR system is operating in a classification mode, then the folding mirror 140 is removed, so that the light is directed to the digicon 142 located behind the corrector plate 110. The digicon 142, as described in FIGS. 7A and 7B, includes a high resolution CCD detector 144.

Included in FIG. 8 is a block diagram of the detection and image processing circuitry used with the folding mirror embodiment of the invention shown in FIG. 7A. For the most part, this processing circuitry is the same as that shown and described in connection with FIG. 6, and the same reference numerals are used to refer to like parts. The main difference between the detection and processing circuitry of FIGS. 8 over that of FIG. 6 is that in FIG. 8 there are two digicon tubes, so there must be appropriate signals coupled to both digicons. Also, in FIG. 8, the deflection coil power supply 124' is used to power an appropriate coil or other device, not shown, used to control the foldable mirror 140, rather than to deflect the electron beam within one of the digicon tubes 146 or 142.

While the invention herein disclosed has been described by means of specific embodiments and applications thereof, numerous modifications and variations could be made thereto by those skilled in the art without departing from the scope of the invention set forth in the claims. For example, the receiving optics shown in FIGS. 6 and 8, utilizing a Schmidt camera may be replaced by any suitable optical system, including Fresnel lenses and non-reflective optics, or a combination thereof. If addition, narrow band optical filter elements may be inserted in the focal plane of the optical system, the entrance aperture, or any convenient intermediate point in the receiver optical train. A filter placed in the aperture plane may be realized, for example, by a mosaic of individual filter elements that are supported in a hexagonal honeycomb support structure. It is also to be emphasized that the invention is not limited to used from an airborne platform, or airplane, but can also be used from an underwater platform, e.g., a ship hull, to search for and classify underwater objects.

It will also be apparent to one skilled in the art that the present invention set forth herein can be used to detect and determine the range to small objects in earth orbit or following a sub-orbital trajectory. For this application, it may be advantageous to reverse the detection/classification procedures set forth herein. In particular, the x,y coordinates of the object can be determined with the low bandwidth, high resolution ability with a gate-on time appropriate for the z dimension being searched. Once the object x,y coordinates are determined, the digicon beam is deflected (and possibly zoomed) to the high bandwidth detector array to provide a range determination to the object.

It is further noted that the photocathode material used with a digicon made in accordance with the present invention may be realized from numerous photocathode materials, such as multi-alkaline, whose spectral response characteristics are selected based on the requirements of the particular application at hand.

What is claimed is:

1. A light detection and ranging (LIDAR) method for remotely detecting and identifying the location of an object in a target area comprising:
   (a) transmitting a first pulse of laser energy at known coordinates in the target area from a location spaced from the target area;
   (b) receiving with a receiver a first return pulse of laser energy comprising a reflection of the first pulse from an object within the target area and forming a first return signal therefrom;
   (c) directing the first return signal to a low resolution detector to develop a first output signal representative of the first return pulse and including an object signature for the object within the target area;
   (d) processing the first output signal to measure the time at which the object signature is observed in the first output signal relative to the time at which said first pulse is transmitted, whereby a round-trip signal transmission time is determined, said round-trip signal transmission time providing a measure of the depth of said object within the target area;
   (e) transmitting a second pulse of laser energy at the same coordinates of the target area as was the first pulse of laser energy;
   (f) receiving with the receiver a second return pulse of laser energy after waiting said round-trip signal transmission time from the transmission of said second pulse, whereby said second return pulse contains primarily laser energy reflected from said object, and forming a second return signal therefrom;
   (g) directing the second return signal to a high resolution detector to develop a second output signal representative of the second return signal; and
   (h) electronically processing the second return pulse to form an image of the detected object.

2. The LIDAR method as set forth in claim 1 wherein the step of receiving the first return pulse includes passing the first return pulse through an optical filter that allows only a specified wavelength to pass therethrough, said first pulse of laser energy being of said specified wavelength, whereby background radiation having wavelengths other than said specified wavelength is removed from the detection of the first return pulse.

3. The LIDAR method as set forth in claim 1 wherein the steps of receiving the first and second return pulses includes:
   receiving and respectively directing the first and second return pulses to a digicon detector; and
   electronically producing electrical signals representative of the respective return pulse and comprising the first and second output signals.

4. The LIDAR method as set forth in claim 3 wherein producing the electrical signals in said digicon detector comprises:
   directing the first or second return pulse to a photocathode,
   converting the receiving pulse to an electron beam at the photocathode and comprising one of the return signals,
   electrostatically accelerating said electron beam and focusing and steering the accelerated electron beam to an anode detector, and
   extracting an electrical signal comprising one of the output signals from said anode detector representative of the electron beam striking said anode detector, and hence representative of the received pulse.

5. The LIDAR method as set forth in claim 4 further including directing the first and second return pulses to a single digicon detector, said single digicon detector including two anode detectors, a first anode detector comprising the low resolution detector, and a second anode detector comprising the high resolution detector, and means for magnetically steering said electron beam to either said first or second anode detector; and wherein said LIDAR method further includes magnetically steering said electron beam to said first anode detector when detecting said first return pulse, and steering said electron beam to said second anode detector when detecting said second return pulse.

6. The LIDAR method as set forth in claim 5 wherein said high resolution detector includes an array of a large number of pixels, each pixel generating a pixel output signal representative of the magnitude of the electron beam that strikes that particular pixel, and wherein the step of electronically processing the second output signal to form the image of said detected object includes examining the pixel output signal from all of said pixels.

7. The LIDAR method as set forth in claim 5 wherein said low resolution detector includes at least one pixel, said at least one pixel generating a pixel output signal representative of the magnitude of the electron beam that strikes said at least one pixel, and wherein the step of measuring the time at which the object signature is observed comprises noting the time at which an output object signal is generated by said at least one pixel relative to the time at which said first pulse was transmitted.

8. The LIDAR method as set forth in claim 5 wherein said single digicon detector further includes means for selectively blocking the electron beam intermediate said photocathode and said anode detectors, and wherein said LIDAR method further includes blocking the electron beam after the transmission of said second laser pulse for all but a short time period that begins after said round-trip signal transmission time.

9. The LIDAR method as set forth in claim 4 further including selectively changing the focusing of said electron beam, the changing of said focus causing the image of the detected object to electronically zoom in or zoom out.

10. The LIDAR method as set forth in claim 4 further including optically steering said first return pulse to a first digicon detector and said second return pulse to a second digicon detector, the anode detector of said first digicon detector comprising the low resolution detector, and the anode detector of said second digicon detector comprising the high resolution detector.

11. The LIDAR method as set forth in claim 10 wherein said low resolution detector used in said first digicon detector includes at least one pixel, said at least one pixel generating a pixel output signal representative of the magnitude of the electron beam that strikes said at least one pixel, and wherein the step of measuring the time at which the object signature is observed comprises noting the time at which an output object signal is generated by said at least one pixel relative to the time at which said first pulse was transmitted.

12. The LIDAR method as set forth in claim 10 wherein said high resolution detector used in said second digicon detector includes an array of a large number of pixels, each pixel generating a pixel output signal representative of the magnitude of the electron beam that strikes that particular pixel, and wherein the step of electronically processing the second output signal to form the image of said detected object includes examining the pixel output signal from all of said pixels.

13. The LIDAR method as set forth in claim 12 wherein said second digicon detector further includes means for selectively blocking the electron beam intermediate said photocathode and said anode detector, and wherein said LIDAR method further includes blocking the electron beam after the transmission of said second pulse for all but a short time period that begins after said round-trip signal transmission time.

14. A light detection and ranging (LIDAR) system for remotely detecting and identifying the location of an object in a target area comprising:
  (a) transmitter means for transmitting a first pulse of laser energy at known coordinates in the target area from a location above the target area and for transmitting a second pulse of laser energy at the same coordinates of the target area as was the first pulse of laser energy;
  (b) receiver means for (i) receiving a first return pulse of laser energy comprising a reflection of the first pulse from an object within the target area and (ii) for receiving a second return pulse of laser energy during a window of time following the transmission of the second laser pulse, whereby the second return pulse contains laser energy from the second pulse reflected primarily from said object;
  (c) high bandwidth, low resolution signal detection means;
  (d) high resolution signal detection means;
  (e) means for forming first and second return signals from and representative of the first and second return pulses;
  (f) return signal control means for directing the first return signal to the high bwadwidth, low resolution detector means to develop a first output signal representative of the first return pulse and for directing the second return signal to the high resolution detector means to develop a second output signal representative of the second return pulse;
  (g) timing and control means responsive to the first output signal for (i) measuring the time at which an object signature is present in said first return pulse relative to the time at which said first pulse is transmitted, whereby a round-trip signal transmission time is determined, said round-trip signal transmission time providing a measure of the depth of said object within the target area and (ii) generating a gate signal for opening the receiver means during the window of time including the round-trip signal transmission time after the second pulse is transmitted;
  (h) means for electronically processing the second output signal to form an image of the detected object.

15. The LIDAR system as set forth in claim 14 wherein said receiver means includes optical means for directing said first return pulse to a first detector comprising the high bandwidth, low resolution detector, said optical means including an optical filter that allows only a specified wavelength to pass therethrough, said first pulse of laser energy being of said specified wavelength, whereby background radiation having wavelengths other than said specified wavelength is removed from the laser energy directed to the first detector.

16. The LIDAR system as set forth in claim 15 wherein: said receiver means includes means for detecting returned laser energy from at least one pixel of the target area at which the first pulse is directed, said first detector includes means for generating a pixel output signal representative of the magnitude of the returned laser energy from said at least one pixel and comprising the first output signal, and wherein said timing and control means for measuring the time at which the first return pulse contains an object signature comprises timing means for determining the time at which an output signal is generated by said first detector relative to the time at which said first pulse was transmitted.

17. The LIDAR system as set forth in claim 16 wherein said first detector comprises a first digicon detector, said first digicon detector having photocathode means for receiving the first return pulse and converting it to an electron beam comprising the first return signal, means for accelerating and focusing said electron beam to an anode detector, and means for extracting an electrical signal from said anode detector comprising the first output signal that is representative of the magnitude of the electron beam striking said anode detector, and hence representative of the first return pulse, in which manner said digicon detector electronically amplifies said first return pulse and provides an electrical output signal representative of the first return pulse.

18. The LIDAR system as set forth in claim 17 wherein said anode detector of said first digicon detector comprises an n×m diode array, where n and m are integers between one and 16, each diode in said diode array generating an output signal having a magnitude proportional to the magnitude of the electron beam striking said diode, said diode array having a resolution of n×m pixels.

19. The LIDAR system as set forth in claim 15 wherein said optical means directs said second return pulse to a second detector comprising the high resolution detector and said LIDAR system including gating means for blocking the presentation of said second return pulse to said second detector until after said round-trip signal transmission time has elapsed as measured from the time of transmission of said second pulse.

20. The LIDAR system as set forth in claim 19 wherein: said receiver means includes means for detecting returned laser energy from an array of a plurality of relatively small pixels of the target area at which the second pulse is directed, said second detector includes means for generating a respective small pixel output signal representative of the magnitude of the returned laser energy from each of said plurality of small pixels and comprising the second output signal, and wherein said means for electronically processing the second output signal to form an image of the detected object comprises means for examining all of said respective small pixel output signals.

21. The LIDAR system as set forth in claim 20 wherein said second detector comprises a second digicon detector, said second digicon detector having photocathode means for receiving the second return pulse and converting it to an electron beam comprising the second return pulse, acceleration means for accelerating said electron beam and and focusing means for focusing the electron beam to an anode detector, and means for extracting an electrical signal from said anode detector comprising the second output signal that is representative of the magnitude of the electron beam striking said anode detector, and hence representative of the second return pulse, in which manner said digicon detector electronically amplifies said second return pulse and provides an electrical output signal representative of the second return pulse.

22. The LIDAR system as set forth in claim 21 wherein said anode detector of said second digicon detector comprises a charge coupled device (CCD) array, the surface area of said CCD array being divided into an array of n×m pixels, where n and m are integers greater than 16, each pixel of said CCD array providing an output signal having a magnitude proportional to the magnitude of the electron beam striking said pixel.

23. The LIDAR system as set forth in claim 22 further including means for controlling the acceleration and focusing of said electron beam within said second digicon detector, whereby the image formed of the detected object can be zoomed in and out.

24. The LIDAR system as set forth in claim 14 wherein items (c), (d) and (e) comprise a dual detector digicon, said dual detector digicon comprising:
an evacuated tube having a longitudinal axis;
photocathode means at one end of said evacuated tube for respectively receiving the first and second return pulses and converting them to an electron beam comprising the first and second return signals;
acceleration/focussing means for accelerating said electron beam along said longitudinal axis and selectively focusing it on one of two anode detectors, each positioned at the other end of said evacuated tube, a first anode detector comprising a low resolution detector having a high bandwidth adapted to receive an electron beam corresponding to said first return pulse, and a second anode detector comprising a high resolution detector having a low bandwidth adapted to receive an electron beam corresponding to said second return pulse; and
means for extracting respective electrical signals from said first and second anode detectors and comprising the first and second output signals that are representative of the magnitude of the electron beam striking the corresponding anode detector, and hence representative of the first or second return pulse, whereby said digicon detector electronically amplifies said first and second return pulses and provides respective first and second electrical output signals representative of said first and second return pulses.

25. The LIDAR system as set forth in claim 24 wherein said first anode detector has a resolution of up to and including 16 by 16 pixels, and said second anode detector has a resolution of at least 16 by 16 pixels.

26. The LIDAR system as set forth in claim 24 wherein said first anode detector comprises a diode array, and said second anode detector comprises a charge coupled device (CCD) array.

27. The LIDAR system as set forth in claim 24 wherein said second anode detector is positioned on-line with said longitudinal axis, whereby a non-deflected electron beam accelerated along the longitudinal axis strikes said second anode detector.

28. The LIDAR system as set forth in claim 27 wherein said first anode detector is positioned off-line with the longitudinal axis, whereby an electron beam accelerated along the longitudinal axis of said dual detector digicon must be deflected in order to strike said first anode detector.

29. The LIDAR system as set forth in claim 28 wherein said beam acceleration/focussing means further includes magnetic deflection means for magnetically deflecting said electron beam off-line from said longitudinal axis, said magnetic deflection means being activated to deflect said electron beam whenever said first return pulse is to be detected, and said magnetic deflection means being turned off to allow said electron beam to travel without deflection whenever said second return pulse is to be detected.

30. The LIDAR system as set forth in claim 29 wherein said beam acceleration/focussing means includes means for electrostatically accelerating said electron beam along the longitudinal axis of said dual detector digicon.

31. The LIDAR system as set forth in claim 30 wherein said means for electrostatically accelerating said electron beam includes a plurality of spaced apart conductive rings that surround said evacuated tube, and means for applying a voltage potential between selected ones of said plurality of spaced apart conductive rings.

32. A dual detector digicon, said dual detector digicon comprising:
an evacuated tube having a longitudinal axis;
photocathode means at one end of said evacuated tube for respectively receiving a return pulse of laser energy and converting it to an electron beam;
gating means behind said photocathode means for selectively gating said electron beam ON or OFF;
acceleration/focusing means for accelerating said electron beam along said longitudinal axis and selectively focusing it on one of two anode detectors, each positioned at the other end of said evacuated tube, a first anode detector comprising a low resolution detector having a high bandwidth adapted to receive an electron beam corresponding to a first return pulse, and a second anode detector comprising a high resolution detector having a narrow bandwidth adapted to receive a gated electron beam corresponding to a second return pulse; and
means for extracting respective electrical signals from said first and second anode detectors that are representative of the magnitude of the electron beam striking the corresponding anode detector, and hence representative of the first or second return pulse, whereby said digicon detector electronically amplifies said first and second return pulses and provides respective electrical output signals representative of said first and second return pulses.

33. The dual detector digicon as set forth in claim 32 wherein said first anode detector has a resolution of no more than 16 by 16 pixels, and said second anode detector has a resolution of at least 16 by 16 pixels.

34. The dual detector digicon as set forth in claim 32 wherein said first anode detector comprises a diode array, and said second anode detector comprises a charge coupled device (CCD) array.

35. The dual detector digicon as set forth in claim 32 wherein said second anode detector is positioned on-line with said longitudinal axis, whereby a nondeflected electron beam accelerated along the longitudinal axis strikes said second anode detector.

36. The dual detector digicon as set forth in claim 35 wherein said first anode detector is positioned off-line with the longitudinal axis, whereby an electron beam accelerated along the longitudinal axis of said dual detector digicon must be deflected in order to strike said first anode detector.

37. The dual detector digicon as set forth in claim 36 wherein said beam acceleration/focussing means further includes magnetic deflection means for magnetically deflecting said electron beam off-line from said longitudinal axis, said magnetic deflection means being activated to deflect said electron beam whenever said first return pulse is to be detected, and said magnetic deflection means being turned off to allow said electron beam to travel without deflection whenever said second return pulse is to be detected.

38. The dual detector digicon as set forth in claim 32 wherein said beam acceleration/focussing means includes means for electrostatically accelerating said electron beam along the longitudinal axis of said dual detector digicon.

39. The dual detector digicon as set forth in claim 38 wherein said means for electrostatically accelerating said electron beam includes a plurality of spaced apart conductive rings that surround said evacuated tube, and means for applying a voltage potential between selected ones of said plurality of spaced apart conductive rings.

40. The dual detector digicon as set forth in claim 39 further including electrostatic zoom means for selectively applying a voltage potential between appropriate ones of said spaced apart conductive rings so as to selectively shrink or expand the cross sectional area of the electron beam that strikes said second anode detector.

41. A method of three-dimensional light detection and ranging (LIDAR) for remotely detecting and imaging an object in a target area comprising:
  (a) transmitting a first pulse of laser energy at known coordinates in the target area from a location spaced from the target area;
  (b) detecting a first return pulse of optical energy reflected from a surface of an object within the target area and measuring the time at which said return pulse is detected relative to the time at which said first laser pulse is transmitted, whereby a round-trip signal transmission time is determined, said round-trip signal transmission time providing a measure of the depth of said object within the target area;
  (c) transmitting a second pulse of laser energy at the same coordinates of the target area as was the first pulse of laser energy;
  (d) detecting a second return pulse of optical energy after waiting said round-trip signal transmission time from the transmission of said second laser pulse, whereby said second return pulse contains primarily laser energy reflected from the surface of said object at the measured depth of said object;
  (e) electronically processing the second return pulse to form an image of the detected surface of the object at the measured depth of said object;
  (f) repeating steps (c)-(e) a plurality of times, with each repetition of step (d) including a wait time that comprises said round-trip signal transmission time adjusted by an incremental amount from the previous wait time, whereby each repetition of steps (c)-(e) forms an image of the detected surface of the object and its shadow at different depths; and
  (g) electronically processing the images formed to form a three-dimensional image of the detected object and its shadow.

* * * * *